United States Patent [19]

Takatsu

[11] Patent Number: 5,644,253
[45] Date of Patent: Jul. 1, 1997

[54] MULTIPLE-VALUED LOGIC CIRCUIT

[75] Inventor: Motomu Takatsu, Kawasaki, Japan

[73] Assignee: Fujitsu Limited, Kanagawa, Japan

[21] Appl. No.: 618,420

[22] Filed: Mar. 8, 1996

[30] Foreign Application Priority Data

Mar. 30, 1995 [JP] Japan .................................. 7-073925

[51] Int. Cl.$^6$ .............................................. H03K 17/735
[52] U.S. Cl. ............................ 326/35; 326/59; 395/24
[58] Field of Search .............................. 326/35–36, 53, 326/59; 364/769; 395/24; 327/82, 365

[56] References Cited

U.S. PATENT DOCUMENTS

| | | | |
|---|---|---|---|
| 3,260,863 | 7/1966 | Burns et al. | 326/36 |
| 4,962,342 | 10/1990 | Mead et al. | 326/36 X |
| 5,039,871 | 8/1991 | Engeler | 326/36 X |
| 5,258,657 | 11/1993 | Shibata et al. | 326/35 |
| 5,353,383 | 10/1994 | Uchimura et al. | 326/35 X |
| 5,444,411 | 8/1995 | Yang et al. | 326/36 X |
| 5,548,685 | 8/1996 | Wang | 395/24 |

OTHER PUBLICATIONS

"Hardware–Backpropagation Learning of Neuron MOS Neural Networks", Ishii et al, *IEDM Tech. Digest*, 1992, pp. 435–438.

"Neuron MOS Voltage–Mode Circuit Technology for Multiple–Valued Logic", Shibata et al, *IEICE Trans. Electron.*, vol. E76–C, No. 3, Mar. 1993, pp. 347 –356.

*Primary Examiner*—David R. Hudspeth
*Attorney, Agent, or Firm*—Nikaido Marmelstein Murray & Oram LLP

[57] ABSTRACT

There are provided n operation circuits in a multiple-valued logic circuit which receives plural multiple-valued input logic signals corresponding to respective numeral values and outputs a multiple-valued output logic signal corresponding to a sum of the respective numeral values. The kth operation circuit includes multiple-input comparators generating carry signals, and multiple-input amplifiers performing weighted linear voltage adding operations on input signals at the kth digit, carry signals of the input signals at the kth digit, and carry signals from the (k–1)th digit where k is 0, 1, 2, . . . , n–1. The multiple-input amplifier has a feedback circuit having a capacitance. The multiple-input comparator and the multiple-input amplifier are connected to corresponding input signals through capacitances. A voltage gain of the multiple-input amplifier is based on a ratio of the capacitance through which the input signal is applied and the capacitance of the feedback circuit.

14 Claims, 34 Drawing Sheets

F I G. 4
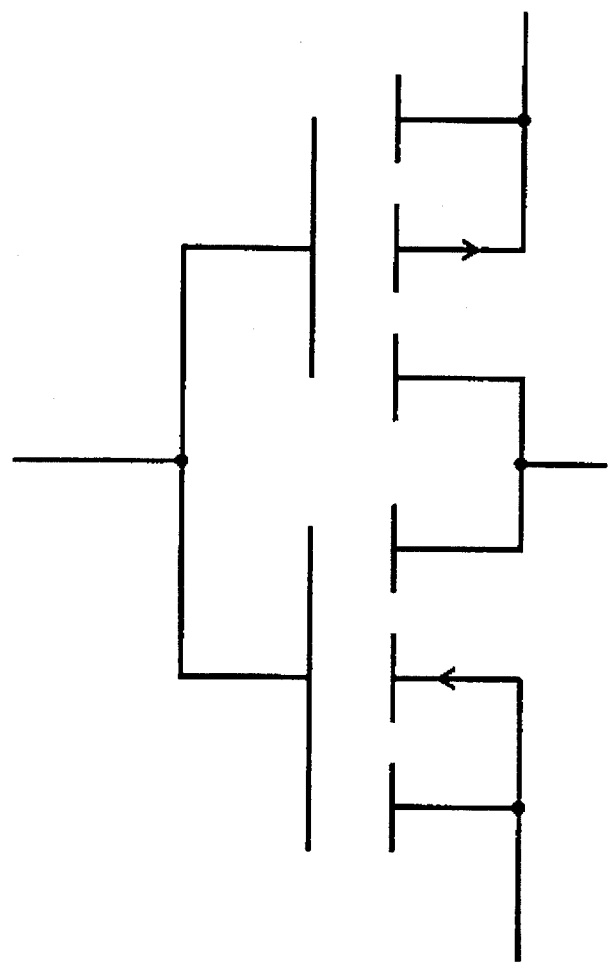

| Wk | -6 | -5 | -4 | -3 | -2 | -1 | 0 | +1 | +2 | +3 | +4 | +5 | +6 |
|---|---|---|---|---|---|---|---|---|---|---|---|---|---|
| Ck | -1 | -1 | -1 | -1 | -1/0 | 0 | 0 | 0 | 0/1 | 1 | 1 | 1 | 1 |
| Sk | -2 | -1 | 0 | 1 | +2/-2 | -1 | 0 | 1 | +2/-2 | -1 | 0 | 1 | 2 |

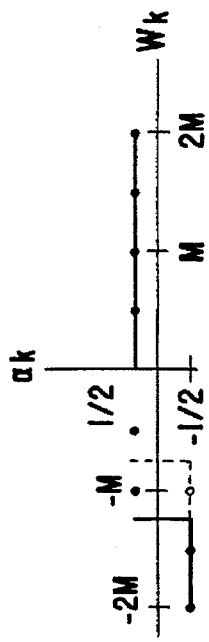
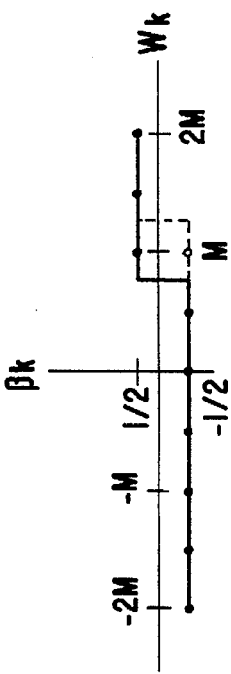
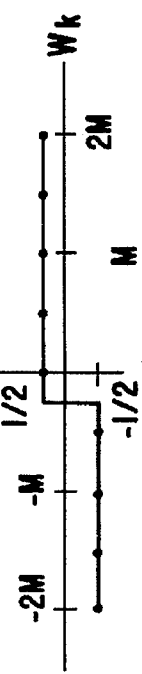
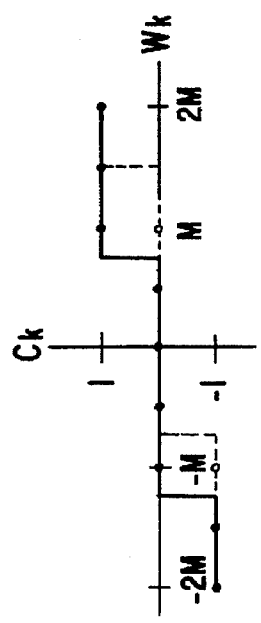
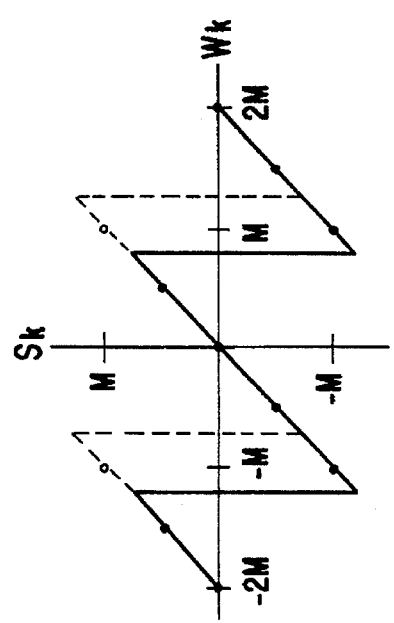
SOLID LINE RELATES TO $\gamma_{k-1} = 1/2$
BROKEN LINE RELATES TO $\gamma_{k-1} = -1/2$

FIG. 18

| Wk | -4 | -3 | -2 | -1 | 0 | 1 | 2 | 3 | 4 |
|---|---|---|---|---|---|---|---|---|---|
| Ck | -1 | -1 | -1/0 | 0 | 0 | 0 | 0/1 | 1 | 1 |
| Sk | 0 | 1 | 2/-2 | -1 | 0 | 1 | 2/-2 | -1 | 0 |

SOLID LINE RELATES TO $\gamma_{k-1} = 1/2$

BROKEN LINE RELATES TO $\gamma_{k-1} = -1/2$

MULTIPLE-VALUED LOGIC CIRCUIT

BACKGROUND OF THE INVENTION

1. Field of the Invention

The present invention generally relates to multiple-valued logic circuits, and more particularly to a multiple-valued logic circuit having a circuit formation in which a plurality of inputs are connected by capacitance coupling and having a function of generating an output based on a weighted linear sum thereof. More specially, the present invention is concerned with a circuit formation called a neuron MOS (Metal Oxide Semiconductor) circuit. In view of circuit functions, the present invention relates to a multiple-valued logic circuit in which three or more voltage levels can be set on one signal line and thus has a function higher than that of normal binary logic circuits.

2. Description of the Related Art

As is known, a neuron-MOS circuit has a formation in which the gate of a MOS transistor is floating and input signals are capacitively coupled to the MOS transistor. Hence, a channel of the transistor is formed in accordance with a weighted linear sum of input voltages. When such a neuron-MOS circuit is applied to a neural network, an FPGA (Flat Pin Grid Array) or the like, the resultant circuit can be simplified. The following document discloses the detail of a neuron-MOS circuit as described above: H. Ishi et al., "Hardware-Backpropagation Learning of Neuron MOS Neural Networks", 1992 IEDM Tech. Dig., pp. 435–pp. 438.

FIG. 1 shows an example of a neuron-MOS circuit. The circuit shown in FIG. 1 a complementary type source-grounded amplifier which includes a P-channel MOS transistor and an N-channel MOS transistor. The two MOS transistors have a common floating gate FG, to which input signals V1–Vn (n is an arbitrary integer) are capacitively coupled. The potential of the floating gate FG is based on a weighted linear sum of the input voltages V1–Vn. An output voltage Vout has a characteristic in which the output voltage Vout sharply falls in response to a value of the floating gate potential.

Generally, a multiple-valued logic circuit is formed by an ECL (Emitter-Coupled Logic) circuit or an IIL circuit (Integrated Injection Logic) circuit, these circuits being made up of bipolar transistors. These bipolar circuits operate in the current mode, by which it is easy to obtain a linear sum. However, there is a disadvantage in that a large amount of power is consumed.

Recently, it has been proposed that the neuron-MOS circuit is applied to the multiple-valued circuits. In the neuron-MOS circuit, it is possible to easily obtain the linear sum of the input voltages in the voltage mode. Hence, it is considered that the application of the neuron-MOS circuit to the multiple-valued circuits contributes to reducing power consumption and simplifying the circuit configuration.

The neuron-MOS circuit shown in FIG. 1 is a binary output circuit which has a disadvantage in that the output voltage is switched from a high level ($V_{DD}$) to a low level ($V_{SS}$) in response to a slight change of the input potential.

An improved neuron-MOS circuit capable of generating multiple-valued outputs has been proposed which is intended to overcome the above disadvantage.

FIG. 2 is a circuit diagram of a complementary-type source-follower amplifier. The source of an N-channel MOS transistor and the source of a P-channel MOS transistor are connected together. The multiple-valued output voltage Vout is obtained at the sources of these transistors. Such a neuron-MOS circuit is described in detail in T. Shibata et al., "Neuron MOS Voltage-Mode Circuit Technology for Multiple-Valued Logic", IECE TRANS. ELECTRON., Vol. E76-C, No. 3, March 1993, pp. 347–pp. 356. A multiple-valued memory using the neuron-MOS circuit shown in FIG. 2 has been proposed in R. Au et al., "Neuron-MOS Multiple-Valued Memory Technology for Intelligent Data Processing", International Conference on Advanced Microelectronic Devices and Processing, pp. 80–pp. 85.

However, the multiple-valued output neuron-MOS circuit shown in FIG. 2 has a disadvantage in that the gain to the potential of the floating gate FG is approximately equal to 1 due to the source-follower configuration and the gain with respect to the individual input voltages V1–Vn is lower than 1. This disadvantage is a serious problem encountered when a multiple-valued logic circuit is formed using the neuron-MOS circuit shown in FIG. 2. Hence, the neuron-MOS circuit can be applied to a limited field.

SUMMARY OF THE INVENTION

It is a general object of the present invention to provide a multiple-valued logic circuit in which the above disadvantage is eliminated.

A more specific object of the present invention is to provide a multiple-valued logic circuit in which an output signal proportional to a weighted sum of input voltages can be obtained with a sufficient gain and a reduced power consumption while the weighting of the input voltages can be arbitrarily designed.

The most effective object of the present invention is a multiple-valued logic circuit which receives plural multiple-valued input logic signals corresponding to respective numeral values and outputs a multiple-valued output logic signal corresponding to a sum of the respective numeral values. It is achieved by the multiple-valued logic circuit comprising n operation circuits where n is an integer. The kth operation circuit comprises: multiple-input comparators generating carry signals; and multiple-input amplifiers performing a weighted linear voltage adding operation on input signals at the kth digit, carry signals of the input signals and carry signals from the (k−1)th digit where k is 0, 1, 2, ..., n−1, the multiple-input amplifier having a feedback path through a capacitance. The multiple-input comparator and the multiple-input amplifier are connected to corresponding input signals through capacitances. The voltage gain of the multiple-input amplifier for the individual input is based on a ratio of the capacitance through which the input signal is applied and the capacitance of the feedback circuit.

The multiple-valued logic circuit may further comprises plural of discriminators for determining at which one of the multiple levels the input logic signals, the output logic signals or intermediate signals available in the multiple-valued logic circuit are, and a multiple-input amplifier for performing a linear voltage adding operation on output signals of the discriminators.

The above objects of the present invention are also achieved by a multiple-valued logic circuit comprising n operation circuits where n is an integer. The kth operation circuit comprising: multiple-input comparators generating carry signals; and other multiple-input comparators for identifying a logical level of a value obtained by subtracting carry signals of the kth digit from a sum of input signals at the kth digit. The multiple-input comparators receive input signals through capacitances.

The just above multiple-valued logic circuit may further comprise, for the kth digit, a multiple-input adder which receives, through capacitances, output signals of the above-mentioned other multiple-input comparators and carry signals from the (k−1)th digit.

The output signals of the above-mentioned other multiple-input comparators located at the kth digit and carry signals from the (k−1)th digit may be output as binary signals.

The multiple-valued logic circuit may further comprise, for the kth digit, binary logic circuits which receive output signals of the other multiple-input comparators located at the kth digit and carry signals from the (k−1)th digit and which outputs resultant binary signals.

Each the multiple-valued logic signal may be a code in which each digit is weighted with a power of R where R is a natural number equal to or greater than 2 and assumes any of N values, which correspond to voltage levels obtained by equally dividing voltage range which is included in an input/output voltage range of the multiple-input comparator and multiple-input amplifier.

The above code may one of a radix-2M (2M+3)-valued code where M is a natural number equal to or greater than 2 and a radix-R N-valued code satisfying N≧R+2 where R and N are natural numbers and R is equal to or greater than 3. In this case, the carry generator may comprise comparators which compare the sum of the input signals at the kth digit and given numeral values.

The above code may be a radix-2M (2M+1)-valued code where M is a natural number. In this case, the carry generator located at the kth digit may comprise comparators which compares the sum of the input signals at the kth digit and a numeral value indicative of the sign of the sum of the input signals at the (k−1)th digit with two given numeral values. The carry signal is represented by two comparison results output by the comparators included in the carry generator. The carry generator located at the kth digit further comprises a discriminator which outputs a numeral value indicative of the sign of the sum of the input signals at the kth digit.

The above code may be a radix-2M (2M+1)-valued code where M is a natural number. In this case, the carry generator may comprise a first comparator which discriminates the sign of the sum of the input signals at the kth digit, and a second comparator which compares, with a given numeral number, the sum of an output signal of the first comparator, the input signals at the kth digit, and a numeral value indicative of the sign of the sum of the input signals at the (k−1)th digit.

The multiple-input amplifier may comprise a circuit which comprises a CMOS inverter circuit which receives the input logic signals through respective capacitances and has a feedback circuit connecting an output terminal of the CMOS inverter circuit and one of input terminals of the CMOS inverter circuit.

Alternatively, the multiple-input comparator may comprise a circuit which receives the input logic signals through respective capacitances.

BRIEF DESCRIPTION OF THE DRAWINGS

Other objects, features and advantages of the present invention will become more apparent when read in conjunction with the accompanying drawings, in which:

FIG. 4 is a circuit diagram of a CMOS inverter which is an example of an inverting type amplifier A shown in FIG. 3;

FIGS. 17A, 17B, 17C, 17D and 17E are graphs of the operation of the circuit shown in FIG. 16;

FIG. 18 is a diagram showing an operation of the circuit shown in FIG. 17 in a case where M=2;

DESCRIPTION OF THE PREFERRED EMBODIMENTS

First, a description will be given of a capacitance-coupling type multiple-input amplifier which is the base of a multiple-valued logic circuit of the present invention.

Figure 1:
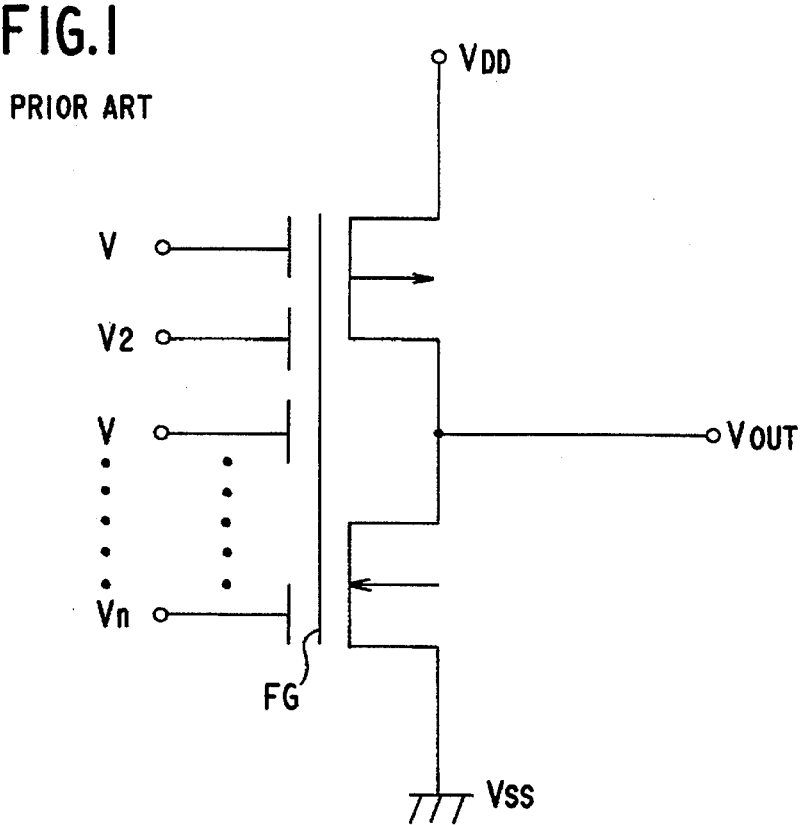
FIG. 1 is a circuit diagram of an neuron-MOS circuit.
Figure 3:
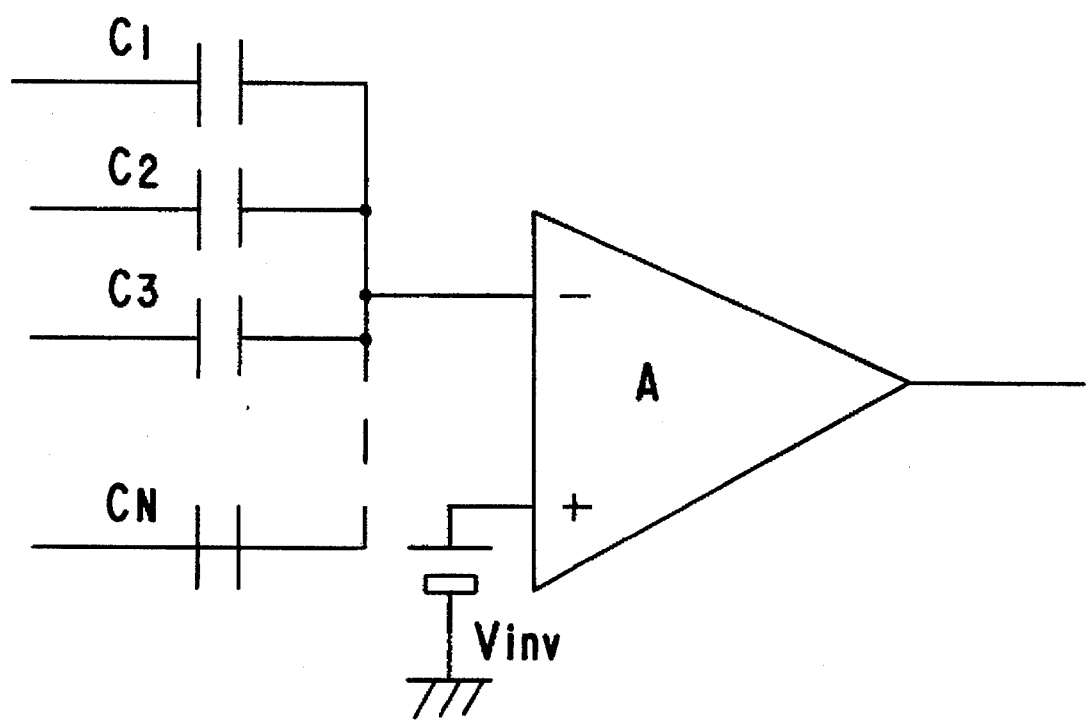
FIG. 3 is an equivalent circuit diagram of a capacitance coupling type multiple-input amplifier (neuron-CMOS inverter)
Figure 5:
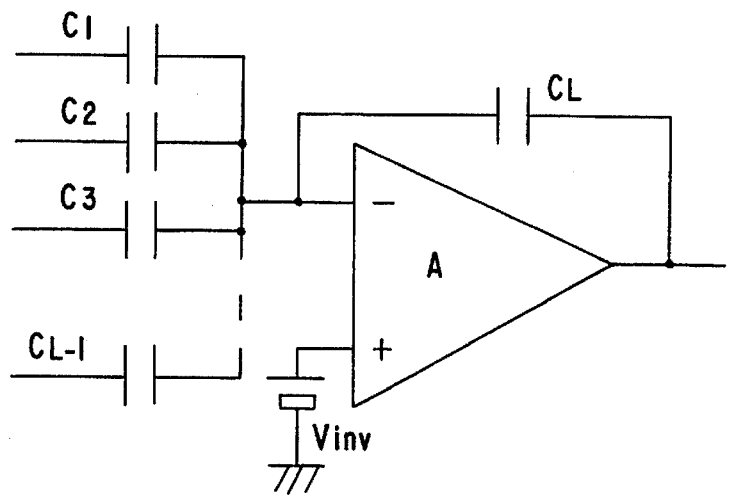
FIG. 5 is a circuit diagram of a capacitance-feedback type multiple-input amplifier which is a basic logic circuit of a multiple-valued logic circuit according to the present invention.

FIG. 3 is an equivalent circuit diagram of a capacitance-coupling multiple-input amplifier (neuron-MOS inverter) which corresponds to the neuron-MOS circuit shown in FIG. 1. FIG. 4 is a circuit diagram of a CMOS inverter which is an example of an inverting-type amplifier A shown in FIG. 3. FIG. 5 is a capacitance-feedback type multiple-input amplifier which is a fundamental element of the multiple-valued logic circuit of the present invention.

The input and output characteristic of the normal CMOS inverter (FIG. 4) can be expressed as follows:

$$V_o = -A(V_i - V_{inv}) + V_{inv} \qquad (1)$$

where $V_i$ denotes an input voltage, $V_o$ is an output voltage, $V_{inv}$ (inverter voltage) is an input voltage value at which the input and output signals have the same potential, A denotes the absolute value of a voltage gain obtained at the inverter voltage $V_{inv}$.

The gate electrode shown in FIG. 3 is floating, and the input signals are capacitively coupled to the floating gate electrode. Hence, the potential $V_g$ of the floating gate is as follows:

$$V_g = \sum_k (C_k/C_{tot})V_k + (C_g/C_{tot})V_{ch} + (C_{st}/C_{tot})V_{st} \qquad (2)$$

where $V_k$ is the potential of an input signal k, $C_k$ is a coupling capacitance between the input signal k and the floating gate. $C_g$ is the capacitance between the floating gate and a channel, $V_{ch}$ is the effective potential of the channel, $C_{st}$ is a stray capacitance, and $V_{st}$ is the effective potential of a portion to which the stray capacitance is coupled. Further, $C_{tot}$ is the sum of capacitances coupled to the floating gates, and is written as follows:

$$C_{tot} = C_g + C_{st} + \sum_{k=1}^{L} C_k \qquad (3)$$

The characteristic of the neuron-MOS inverter can be written as follow from equations (1) and (2):

$$V_o = -A\left[\sum_k (C_k/C_{tot})V_k + (C_g/C_{tot})V_{ch} + (C_{st}/C_{tot})V_{st} - V_{inv}\right] + V_{inv} \qquad (4)$$

$$= -A\left[\sum_k (C_k/C_{tot})(V_k - V_{inv'})\right] + V_{inv'}$$

where $V_{inv'}$ is the effective inverter voltage and is as follows:

$$V_{inv'} = V_{inv} - A/(1+A)[(C_g/C_{tot})V_{ch} + (C_{st}/C_{tot})V_{st}] \qquad (5)$$

Normally, the voltage gain A of the inverter is very large, and thus the voltage gain $A_k$ with respect to the input signal k is also large as indicated below:

$$A_k = -AC_k/C_{tot} \qquad (6)$$

Hence, the output voltage changes from $V_{DD}$ to $V_{SS}$ when the input voltage slightly changes, and an intermediate output value cannot be obtained. Hence, the neuron-MOS inverter cannot produce the output voltage proportional to the weighted linear sum of the input voltages indicated by equation (2), although the inverter has the function of determining whether or not the weighted linear sum of the input voltages is equal to or greater than a threshold value ($V_{inv'}$).

In the capacitance-feedback type multiple-input amplifier shown in FIG. 5, an input terminal (denoted as L) is coupled to the output terminal via a capacitance $C_L$. In this case, the output voltage $V_o$ can be written as follows:

$$V_o = -A\left[\sum_{k=1}^{L-1}(C_k/C_{tot})(V_k - V_{inv'}) + (C_L/C_{tot})(V_o - V_{inv'})\right] + V_{inv'}$$

When rearranging the above equation in regard to $V_o$, the following is obtained:

$$V_o = -1/[1 + (C_L/C_{tot}A)]\left[\sum_{k=1}^{L-1}(C_k/C_L)(V_k - V_{inv'})\right] + V_{inv'} \qquad (7)$$

When the gain A is sufficiently large, equation (7) can be rewritten as follows:

$$V_o = -\sum_{k=1}^{L-1}(C_k/C_L)(V_k - V_{inv'}) + V_{inv'} \qquad (8)$$

Similarly, the voltage gain $A_k$ with respect to each input signal k can be rewritten as follows:

$$A_k = -C_k/C_L \qquad (9)$$

It can be seen from equation (9) that the voltage gain $A_k$ depends on only the capacitance ratio. Hence, when the capacitance ratio is appropriately selected, it is possible to obtain the output voltage proportional to the weighted linear sum of the input voltages without any saturation of the output voltage.

In the following description, the capacitance $C_L$ connected to the output terminal and used as a feedback circuit may be called a feedback capacitance $C_F$.

Figure 2:
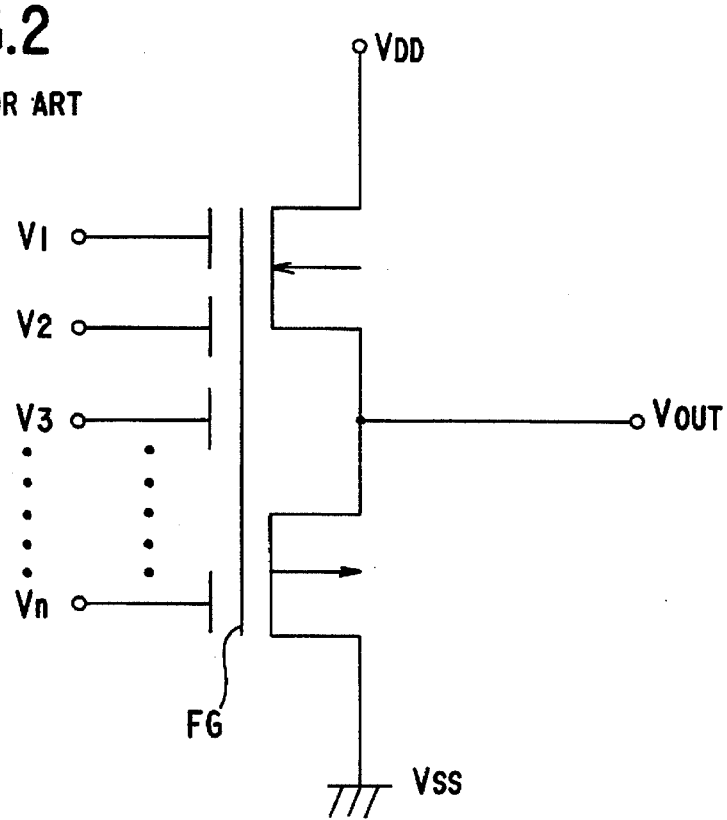
FIG. 2 is a circuit diagram of another neuron-MOS circuit.

When the neuron-MOS source-follower shown in FIG. 2 is used, it is possible to obtain an output signal (multiple output signal) proportional to the weighted linear sum of the input signals.

The characteristic of the source-follower circuit is written as follows:

$$V_o = V_f - V_{th} \quad (10)$$

where $V_{th}$ is a potential difference between the input and output signals. Hence, the characteristic of the neuron-MOS source-follower circuit can be written as follows:

$$V_o = \Sigma_k (C_k/C_{tot}) V_k - V_{th} \quad (11)$$

The voltage gain $A_k$ for each input can be written as follows:

$$A_k = C_k/C_{tot} \quad (12)$$

It can be seen from the above that the voltage gain $A_k$ depends only the capacitance ratio and the output signal proportional to the weighted linear sum of the input signals can be obtained without any saturation of the output signal.

However, the voltage gain of the amplifier is less than 1 even if the gains with respect to all the input signals are gathered. Hence, the voltage gain with respect to each input signal is much more less than 1. Under the above situation, it is not free to select the voltage gain with respect to each input signal. The above is not good for formation of the multiple-valued logic circuit, and the neuron-MOS inverter shown in FIG. 3 can be applied to a limited field.

On the other hand, the multiple-input amplifier with the feedback capacitance $C_L$ shown in FIG. 5 has the voltage gain indicated by equation (9), and this voltage gain can be arbitrarily selected. The feedback capacitance $C_L$ is described in the aforementioned document of Ishii et al. However, this document simply discloses that the input and output characteristic depends on the capacitance ratio, and does not suggest an application of the multiple-input amplifier to multiple-valued logic circuits described below.

A further description of the circuit configuration shown in FIG. 5 will be given. The inverting-type amplifier A is formed of the CMOS circuit shown in FIG. 4, and the voltage gain with respect to each input signal is determined with the feedback circuit of the capacitance $C_L$. The effective inverter voltage $V_{inv}$ can be changed by one or some input terminals are directly connected to a d.c. voltage source. It will be assumed that input x is connected directly to the d.c. voltage source, and the effective inverter voltage $V_{inv''}$ with respect to the other input signals can be obtained from equation (8) in the following way:

$$\begin{aligned} V_o &= -\sum_{k=1}^{L-1} (C_k/C_L)(V_k - V_{inv'}) + V_{inv'} \\ &= -\sum_{k=1}^{L-1} (C_k/C_L)(V_k - V_{inv'}) - \\ &\quad (C_x/C_L)(V_x - V_{inv'}) + V_{inv'} \\ &= -\sum_{k=1}^{L-1} (C_k/C_L)(V_k - V_{inv''}) + V_{inv''} \end{aligned}$$

Hence, the effective inverter voltage $V_{inv''}$ can be obtained as follows:

$$V_{inv''} = V_{inv'} - \left( C_x / \sum_{k=1}^{L-1} C_k \right)(V_x - V_{inv'})$$

When plural input signals are used for the above purpose, parallel capacitance and an average voltage weighted by the capacitances are used. For example, when capacitances $C_{x1}$ and $C_{x2}$ are connected to $V_{DD}$ and $V_{SS}$ (=0), respectively, an equivalent voltage $V_{DD}C_{x1}/(C_{x1}+C_{x2})$ and equivalent capacitance $C_{x1}+C_{x2}$ are used in the formula.

Next, a description will now be given of basic multiple-valued logic circuits, each utilizing the circuit configuration shown in FIG. 5. These basic multiple-valued logic circuits are used in multiple-valued logic circuits (multiple-valued adder circuits) which will be described in detail later. In the following description, the above-mentioned effective inverter voltage is set to an appropriately value, and the d.c. input for controlling the inverter voltage in the above way is omitted.

Figure 6:
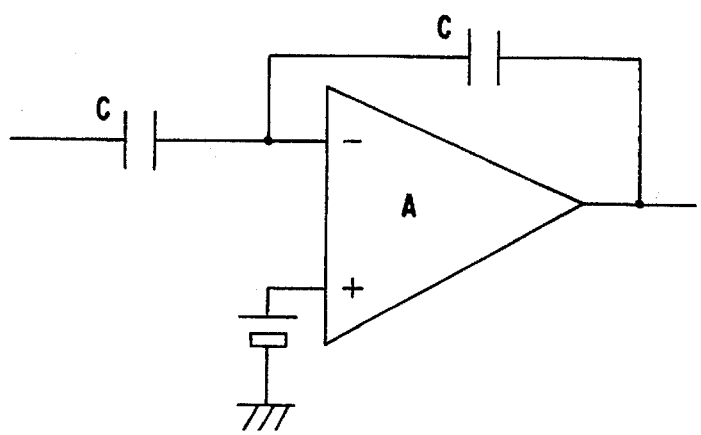
FIG. 6 is a circuit diagram of a multiple-valued inverter using a capacitance-feedback type multiple-input amplifier.

FIG. 6 is a circuit diagram of a multiple-valued inverter. In the configuration shown in FIG. 6, an input capacitance C and a feedback capacitance $C_F$ (=C) have an identical value in order to set the gain of the output signal to the input signal to −1. The effective inverter voltage is set equal to half of the power supply voltage $V_{DD}$. That is, the output voltage $V_o$ can be expressed as follows:

$$V_o = -(V_i - V_{DD}/2) + V_{DD}/2 = V_{DD} - V_i$$

when an N-valued signal x (N is a natural number equal to or greater than 2) corresponds to a voltage level x/(N−1) $V_{DD}$, the NOT inversion ⁻x thereof is as follows:

$$\bar{x} = N - 1 - x$$

The NOT inversion ⁻ appears at the output of the inverter.

Figure 7:
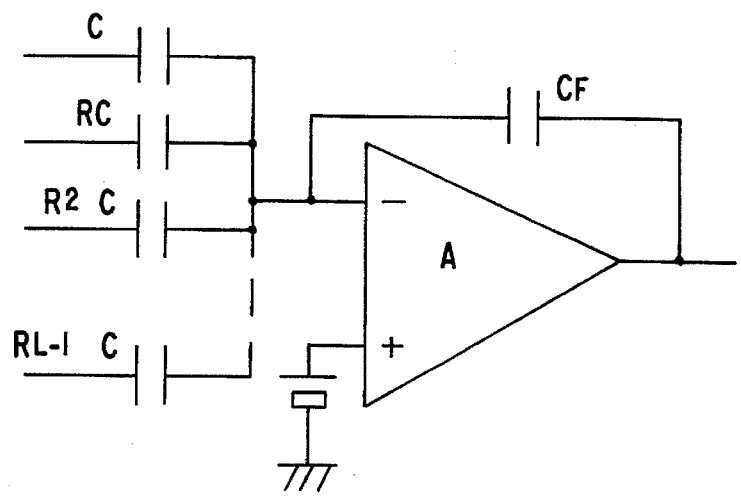
FIG. 7 is a circuit diagram of a radix-R inverting type D/A converter that uses a capacitance-feedback type multiple-input amplifier.

FIG. 7 is a circuit diagram of a radix-R inverting-type D/A converter (R is a natural number equal to or greater than 2). In the configuration shown in FIG. 7, the ratio of the input capacitances is selected so as to be proportional to the power of R (C, RC, $R^2C$, ..., $R^{L-1}C$). Thereby, the gains of the respective input signals are −A, −AR, −AR², ..., −AR$^{L-1}$. The effective inverter voltage $V_{inv}$ is adjusted in the following way. The output voltage $V_o$ of the D/A converter is represented as follows:

$$V_o = -A\Sigma R^{k-1}(V_k - V_{inv}) + V_{inv}$$

When the voltage level x/(R−1)$V_{DD}$ is made to correspond to each digit $x_k$ of the following radix-R input signal:

$$x = \Sigma R^{k-1} x_k$$

the following is obtained:

$$V_o = -V_{DD}(A\Sigma R^{k-1}(x_k/(R-1) -$$
$$V_{inv}/V_{DD}) - V_{inv}/V_{DD})$$
$$= -V_{DD}(A/(R-1)\Sigma R^{k-1}x_k -$$
$$(1 + A(R^L-1)/(R-1))V_{inv}/V_{DD})$$

When the following is assumed:

$$A=(R-1)/(R^L-1), V_{inv}=V_{DD}/2$$

the following is obtained:

$$V_o=V_{DD}(1-1/(R^L-1)\Sigma R^{k-1}x_k)$$

When the following is assumed:

$$A=(R-1)/R^L, V_{inv}=V_{DD}R^L/(2R^L-1$$

the following is obtained:

$$V_o=V_{DD}(1-1/R^L\Sigma R^{k-1}x_k)$$

It can be seen from the above that the output which corresponds to the radix-R L-digit signal x can swing in the approximately full amplitude range.

Figure 8:
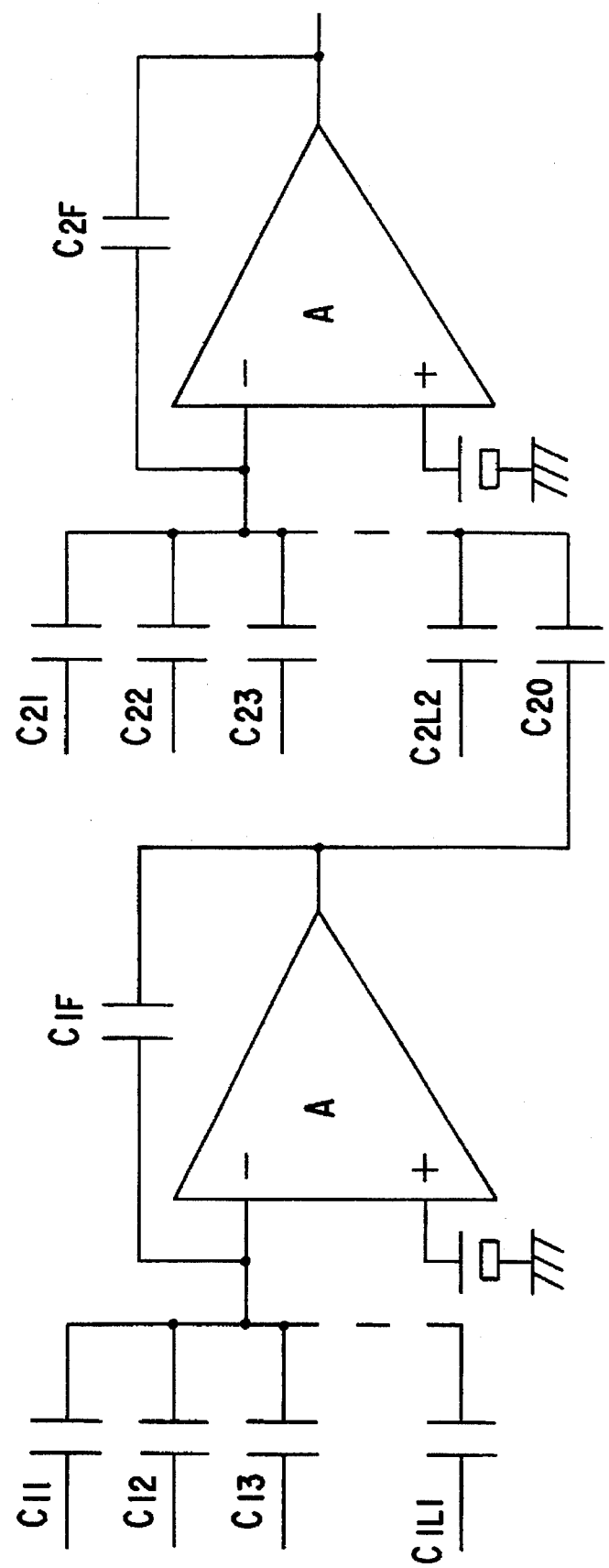
FIG. 8 is a circuit diagram of a multiple-input amplifier that uses a capacitance-feedback type multiple-input amplifier.

FIG. 8 is a circuit diagram of a multiple-valued input amplifier using two capacitance-feedback type multiple-input amplifiers. The circuit shown in FIG. 8 can provide a positive weight. The front-stage amplifier has input capacitances $C_{1k}$ (k=1, 2, ..., L1) and a feedback capacitance $C_{1F}$. The rear-stage amplifier has input capacitances $C_{2l}$ (l=0, 1, 2, ..., L2) and a feedback capacitance $C_{2F}$. The output terminal of the front-stage amplifier is coupled to the 0th input terminal of the rear-stage amplifier through the capacitance $C_{20}$. If the amplifiers have sufficient gain values, $$V_{o1} = -\sum_{k=1}^{L1}(C_{1k}/C_{1F})(V_{1k}-V_{inv1}) + V_{inv1}$$

$$V_{o2} = -\sum_{j=1}^{L2}(C_{2j}/V_{2F})(V_{2j}-V_{inv2}) + V_{inv2}$$

$$= -(C_{20}/C_{2F})(V_{01}-V_{inv2}) -$$

$$\sum_{j=1}^{L2}(C_{2j}/C_{2F})(V_{21}-V_{inv2}) + V_{inv2}$$

$$= -\sum_k(C_{1k}/C_{1F})(V_{1k}-V_{inv}) -$$

$$\sum_j(C_{2j}/C_{2F})(V_{2j}V_{inv}) + V_{inv}$$

It can be seen from equation (10) that both negative and positive weights can be obtained. In equation (10), $C_{1F'}$ and $V_{inv}$ are as follows.

$$C_{1F'} = C_{1F}C_{2F}/C_{20}$$

$$V_{inv} = \left(\left(1 + C_{20}/C_{2F} + \sum_j C_{21}/C_{2F}\right)V_{inv2} -\right.$$

$$\left.(C_{20}/C_{2F}) + \sum_k C_{1k}/C_{1F}\right)V_{vin1}\right) /$$

$$\left(1 + \sum_j C_{2j}/C_{2F} - \sum_k C_{1k}/C_{1F}\right)$$

In order to prevent the front-stage amplifier from being saturated in response to any of the input signals, the following condition must be satisfied:

$$C_{1F} \geq \Sigma C_{1k}$$

Figure 9:
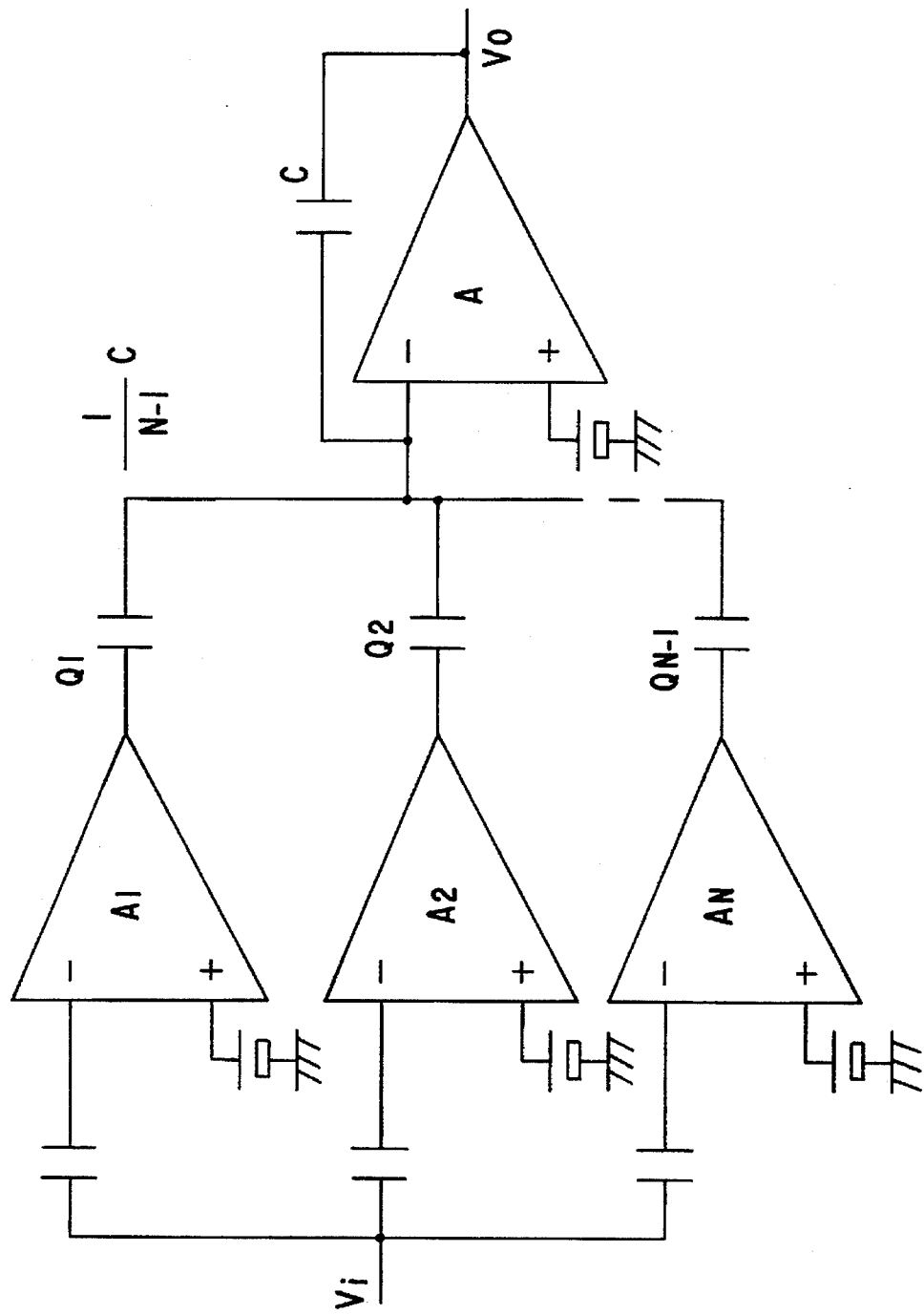
FIG. 9 is a circuit diagram of an N-valued quantizer that uses a capacitance-feedback type multiple-input amplifier.

FIG. 9 is a circuit diagram of an N-valued quantizer using capacitance feedback type multiple-input amplifiers. When the N-nary value n is made to correspond to a voltage level $n/(N-1)V_{DD}$, the threshold values of input comparators $A_1$, $A_2$ and $A_N$ are selected as follows:

$$(n-\frac{1}{2})/(N-1)V_{DD}(n \in \{1, 2, \ldots, N-1\})$$

These outputs are supplied to the rear-stage multiple-input amplifiers with an identical weight $C/(N-1)$.

Figure 10A:
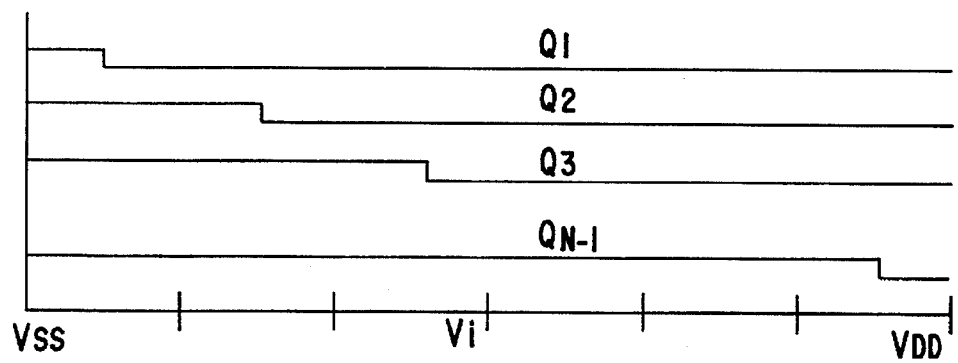
FIGS. 10A and 10B are diagrams showing an operation of the N-valued quantizer shown in FIG. 9.
Figure 10B:
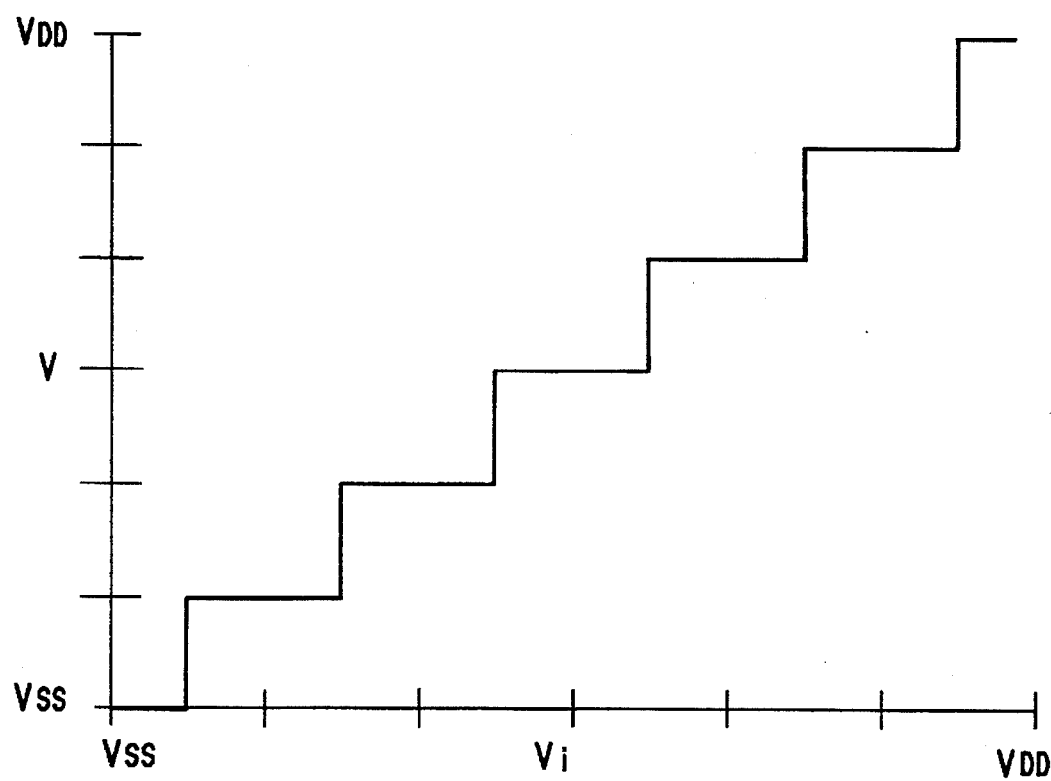

FIGS. 10A and 10B are diagrams of the operation of the N-valued quantizer shown in FIG. 9. More particularly, FIG. 10A shows variations of the output voltage of the comparators $A_1$, $A_2$, $A_3$ (not shown in FIG. 9), ..., $A_N$ with respect to the input voltage $V_i$, and FIG. 10B is a graph of the input/output characteristic of the N-valued quantizer.

Figure 11:
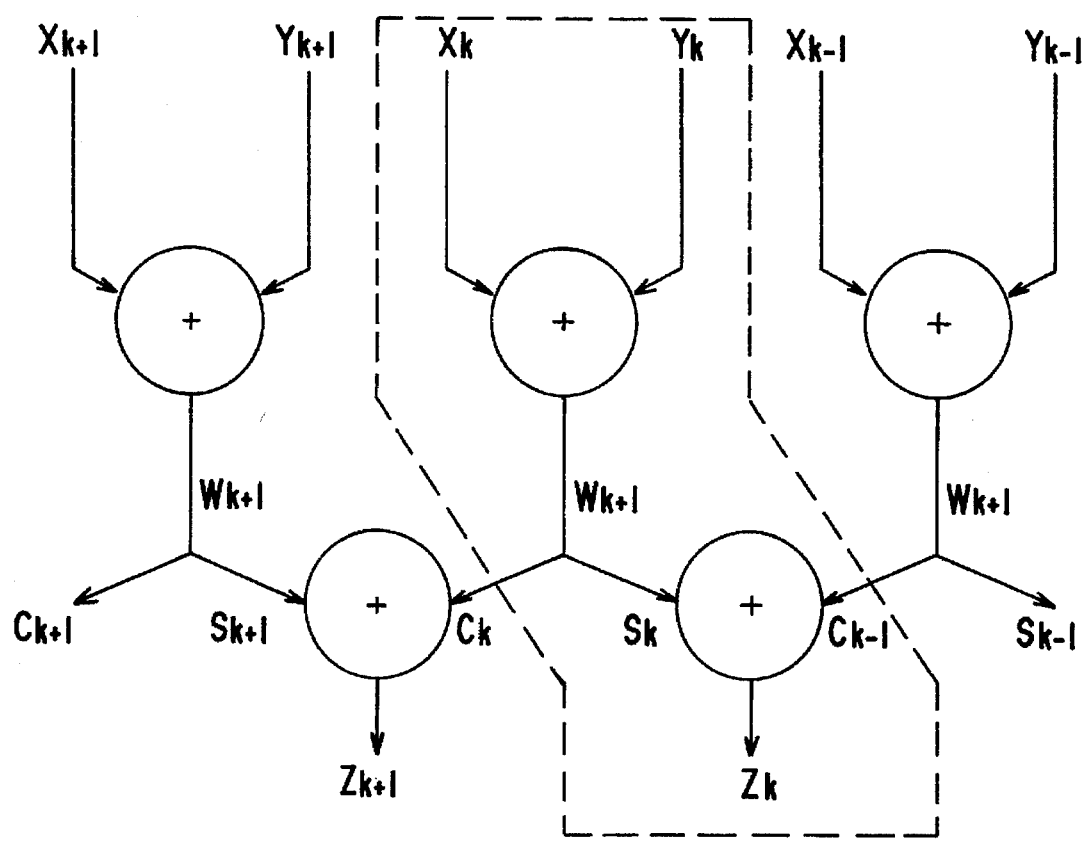
FIG. 11 is a circuit diagram of a part of a radix-R N-valued redundant adder according to an embodiment of the present invention.

FIG. 11 is a diagram of a part of the radix-R N-valued adder (R is an integer equal to or greater than 2). The adder shown in FIG. 11 processes a code in which the weight for each digit is expressed by the power of R (R is an integer equal to or greater than 2: radix-R) and each digit assumes N different values. As such a code, there is an SD (Signed Digit) code in which each digit assumes symmetrical negative and positive values. As is well known, the SD code has a redundancy. For example, a radix-4 SD number consisting of four digits can assume plural of expressions equivalent to "10" in decimal notation (for example, (0022) and (1-3-1-2). The above redundancy means that a numeral value may be expressed by plural expressions. In this regard, the above adder is called radix-R N-valued redundant adder.

In FIG. 11, the $z_k$, the kth digit of the sum z of x and y is obtained by a circuit part (a basic operation circuit of the adder) enclosed by the broken line, and is obtained as the sum of an intermediate output (intermediate sum) $s_k$ (=$x_k$+ $y_k$–$Rc_k$) and a carry signal $c_{k-1}$ from the (k–1)th digit. That is, the propagation of the carry signal is restricted to one digit.

Figure 12:
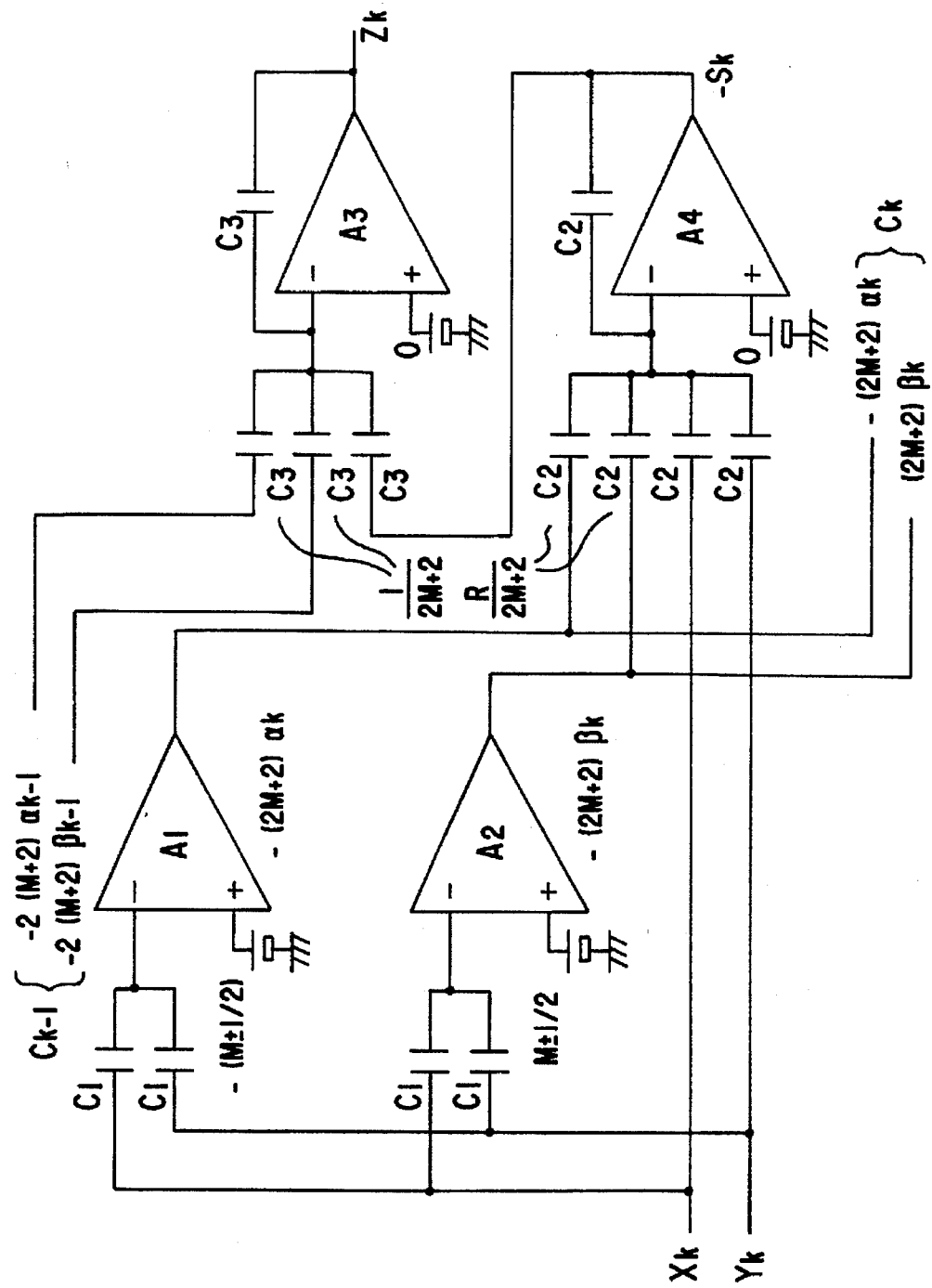
FIG. 12 is a circuit diagram of a part enclosed by a broken line shown in FIG. 11.

FIG. 12 is a circuit diagram of the part of the radix-R N-valued redundant adder enclosed by the broken line shown in FIG. 11 in which R=2M≥4 and N=2M+3. The circuit for R=2M+1≥3 and N=2M+3 can be configured similarly. The sum signal $s_k$ and the carry signal $c_k$ are calculated from the intermediate sum $w_k$ of the input signals $x_k$ and $y_k$, and the sum $z_k$ of the sum signal $s_k$ and the carry signal $c_{k-1}$ from the (k–1)th digit is calculated.

A multiple-input inverted comparator $A_1$ and a multiple-input inverted comparator $A_2$ produce the carry signal $c_k$ from the input signals $x_k$ and $y_k$, the carry signal $c_k$ being propagated to the (k+1)th digit. A multiple-input inverted amplifier $A_4$ produces the sum signal $s_k$ (=$w_k$−$Rc_k$). A multiple-input inverted amplifier $A_3$ produces the final result $z_k$ from the sum signal $s_k$ and the carry signal $c_{k-1}$ from the (k−1)th digit.

A description will now be given of the structure and operation of the circuit shown in FIG. 12 by using some equations.

The input signals of the radix-R (2M+3)-valued redundant adder can be expressed as follows:

$$x = \Sigma R^k x_k (x_k \in \{-(M+1), -M, \ldots, M, M+1\})$$

$$y = \Sigma R^k y_k (y_k \in \{-(M+1), -M, \ldots, M, M+1\})$$

In each digit of the input signals, the intermediate sum $w_k$ of the input signals $x_k$ and $y_k$ is produced and is then resolved into the sum signal $s_k$ ($s_k \in \{-M, -(M-1), \ldots, -1, 0, 1, \ldots, M-1, M\}$) and the carry signal $c_k$ ($c_k \in \{-1, 0, 1\}$). The final answer $z_k$ ($z_k \in \{-(M+1), -M, \ldots, -1, 0, 1, \ldots, M, M+1\}$) is obtained as the sum of the sum signal $s_k$ and the carry signal $c_{k-1}$. That is:

$$x_k = w_k + y_k = S_k + Rc_k$$

$$z_k = s_k + c_{k-1}$$

The carry signal is:

$$c_k = \begin{cases} -1 & (w_k < -M) \\ 0 & (|w_k| \leq M) \\ 1 & (w_k > M) \end{cases}$$

In the case where R=2M, $c_k$ can be equal to −1 for $w_k$=−M and can be equal to 1 for $w_k$=M.

The carry signal $c_k$ is resolved into the two components $\alpha_k$ and $\beta_k$, and is produced from the input signals $x_k$ and $y_k$.

$$\alpha_k = \begin{cases} -1/2 & (w_k < -(M \pm 1/2)) \\ 1/2 & (w_k \geq -(M \pm 1/2)) \end{cases}$$

$$\beta_k = \begin{cases} -1/2 & (w_k \leq (M \pm 1/2)) \\ 1/2 & (w_k > (M \pm 1/2)) \end{cases}$$

where sign "−" in "±" is valid only when R=2M $$c_k = \alpha_k + \beta_k$$

$$s_k = x_k + y_k - R(\alpha_k + \beta_k)$$

$$z_k = x_k + y_k - R(\alpha_k + \beta_k) + \alpha_k + \beta_{k-1}$$

That is, by using the amplifiers each shown in FIG. 8, it is possible to obtain the weighted linear sum $z_k$ of $x_k$, $y_k$, $\alpha_k$ and $\beta_k$.

The capacitance value is determined taking into consideration the fact in which the output signals of the comparators $A_1$ and $A_2$ are levels corresponding to −(2M+2)$\alpha_k$ and −(2M+2)$\beta_k$, respectively when the voltage (n/(2M+2)+½) $V_{DD}$ is assigned to the value n. That is, the output signal of the comparator $A_1$ is −(2M+2)$\alpha_k$, while the weight of the linear summation for $\alpha_k$ is equal to R times the input signal $x_k$. Hence, the capacitance value is set to $\{R/(2M+2)\}C_2$. Similarly, the output signal of the comparator $A_2$ is −(2M+2)$\beta_k$, while the weight for the capacitance receiving the above output signal is equal to R times the input signal $y_k$. Hence, the capacitance value is set to $\{R/(2M+2)\}C_2$.

The input capacitance of the amplifier $A_3$ is determined as follows. The weight of the linear summation for $s_k$ and $c_{k-1}$ is identical. The amplitude of carry signals are −(2M+2) times as much as original values. Hence, the values of the capacitances which receive the carry signals from the (k−1)th digit are $\{1/(2M+2)\}C_3$.

These ratios of capacitances must be changed when voltage range used for multi-valued logic is smaller than the range between $V_{DD}$ and $V_{SS}$.

Figure 13A:
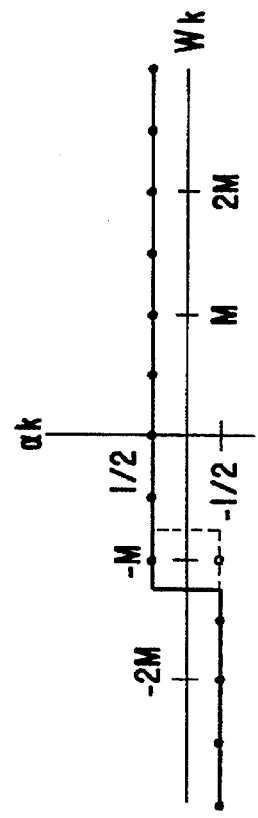
FIGS. 13A, 13B, 13C and 13D are graphs showing an operation of the structure shown in FIG. 12.
Figure 13C:
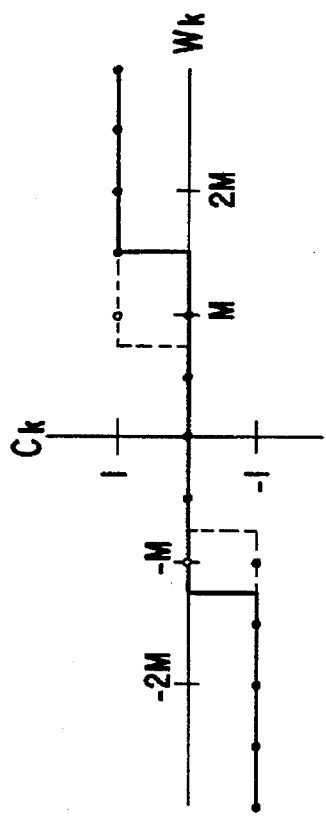
Figure 13B:
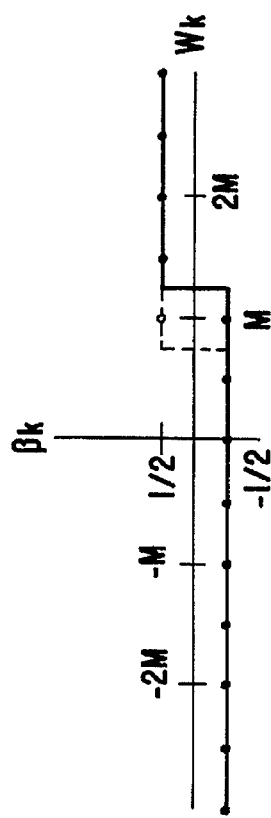
Figure 13D:
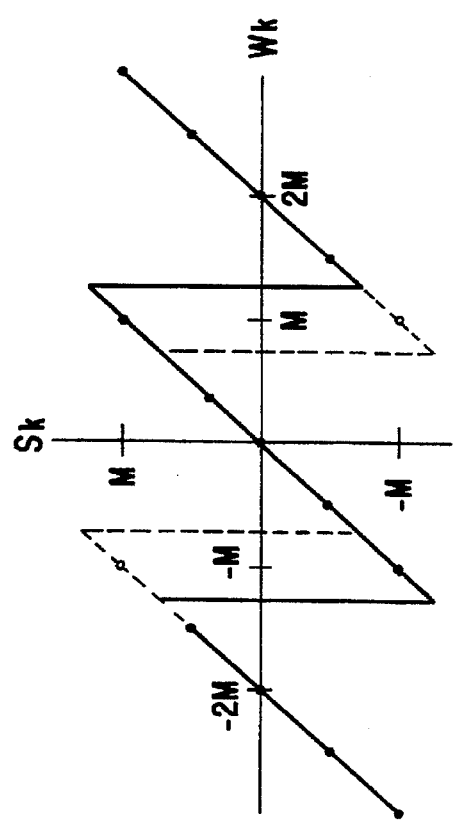

FIG. 13A shows the relation between the intermediate sum $w_k$ and the carry signal $c_k$, and FIG. 13B shows the relation between the intermediate sum $w_k$ and the sum signal $s_k$. FIG. 13C shows the relation between the intermediate sum $w_k$ and the component $\alpha_k$, and FIG. 13D shows the relation between the intermediate sum $w_k$ and the component $\beta_k$. In these figures, the signals can take the values indicated by both the solid and broken lines when R=2M.

As shown in FIGS. 13A through 13D, the carry signal $c_k$ changes before or after ±M as a function of the intermediate sum. Hence, the value of the carry signal $c_k$ can be generated by setting the threshold values of the comparators $A_1$ and $A_2$ to −(M±½) and (M±½), respectively. In this case, the components $\alpha_k$ and $\beta_k$ change as shown in FIGS. 13C and 13D. The output signal −$s_k$ of the amplifier $A_4$ is equal to −{$x_k$+$y_k$−R($\alpha_k$+$\beta_k$)}, and $s_k$ changes as shown in FIG. 13B.

As an example, a case where M=2 will be considered. In the radix-4 7-valued redundant adder, the following is satisfied:

$$w_k = x_k + y_k = 4c_k + s_k$$

Figures 14, 15:
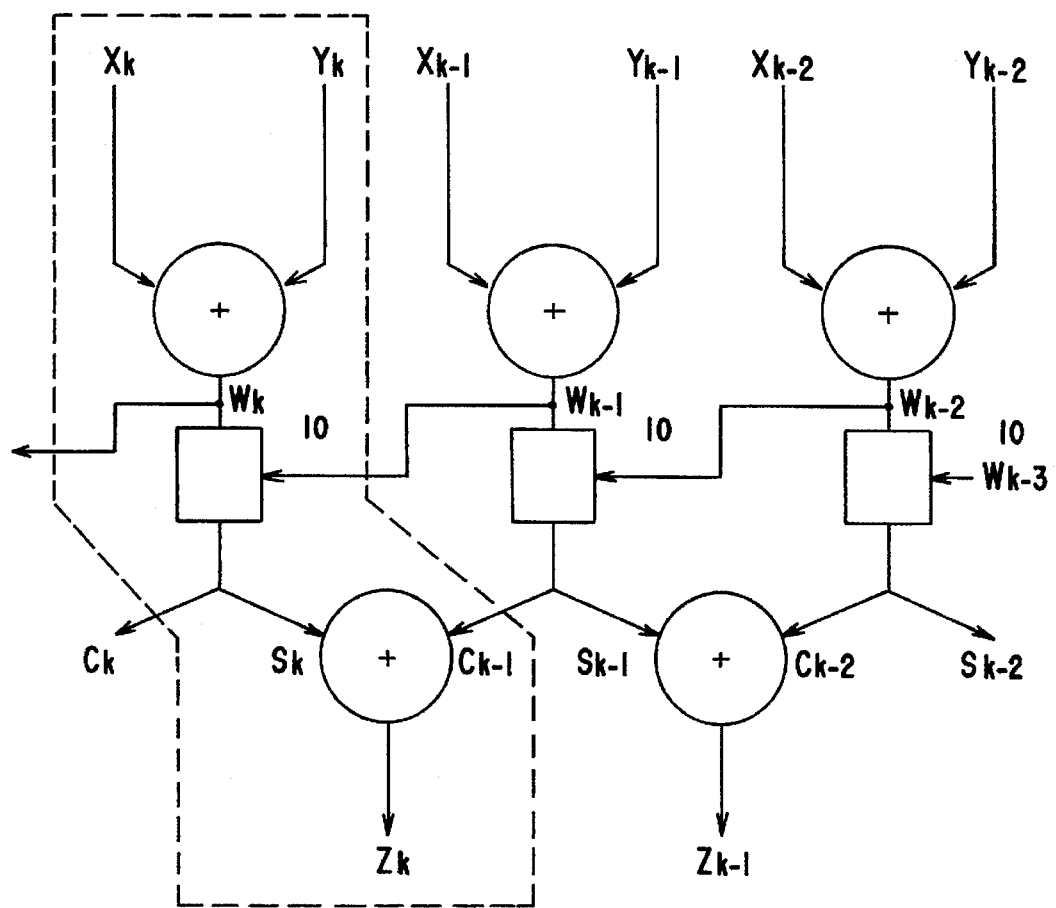
FIG. 14 is a diagram showing an operation of the circuit shown in FIG. 12 in a case where M=2.
FIG. 15 is a circuit diagram of a part of a radix-R N-valued redundant adder according to another embodiment of the present invention.

Hence, the relation of the intermediate sum $w_k$, the carry signal $c_k$ and the sum signal $s_k$ is as shown in FIG. 14. When $w_k$=±2, $c_k$ can take either one of the two values, and $s_k$ is determined to be $w_k$−4$c_k$. With the above in mind, if the threshold values of the comparators $A_1$ and $A_2$ are set to −1.5 and +1.5, respectively, the value of the carry signal $c_k$ can be determined. The output voltages of the comparators $A_1$ and $A_2$ take either the power supply voltage $V_{DD}$ or $V_{SS}$. The voltage $V_{DD}$ corresponds to +3 (=M+1) in 7-valued notation (M=2), and the voltage $V_{SS}$ corresponds to −3 (=−(M+1)). Hence, the output signals of the comparators $A_1$ and $A_2$ are respectively −(2M+2)$\alpha_k$ and −(2M+2)$\beta_k$, and the capacitances which receive the above output signals have the following values:

$$\{R/(2M+2)\}C_2 = 4/(2\times2+2) = \tfrac{2}{3}C_2$$

The linear summation of $s_k$ and $c_{k-1}$ which are performed by the amplifier $A_3$ are equally weighted. When M=2, the carry signals from the (k−1)th digit are equal to six times the original value thereof. Hence, the two capacitances which receive the carry signals corresponding to $C_{k-1}$ are weighed so as to be ⅙ the capacitance $C_3$ that receives the sum −$s_k$.

The description of the radix-2M (2M+3)-valued redundant adder shown in FIG. 12 is related to the case where the SD code which assumes the symmetrical negative and positive values in each digit is used. Other adders can be configured in the same way as described above when using a code having asymmetrical values in each digit (for example, radix-2M (2M+2)-valued code assuming asymmetrical values $x_k \in \{-M, \ldots, M, M+1\}$ or $x_k \in \{-M-1, -M, \ldots, M\}$), or a code having only positive values such as $x_k \in \{0, \ldots, 2M, 2M+1\}$.

FIG. 15 is a circuit diagram of a part of a radix-R N-valued redundant adder, which differs from that shown in FIG. 11 in that FIG. 15 relates to R=2M≧2 and N=2M+1 and a process part 10 determines the carry signal $c_k$ at the kth digit by referring to information concerning the intermediate sum $w_{k-1}$ of the (k−1)th digit (more particularly, the sign thereof).

Figure 16:
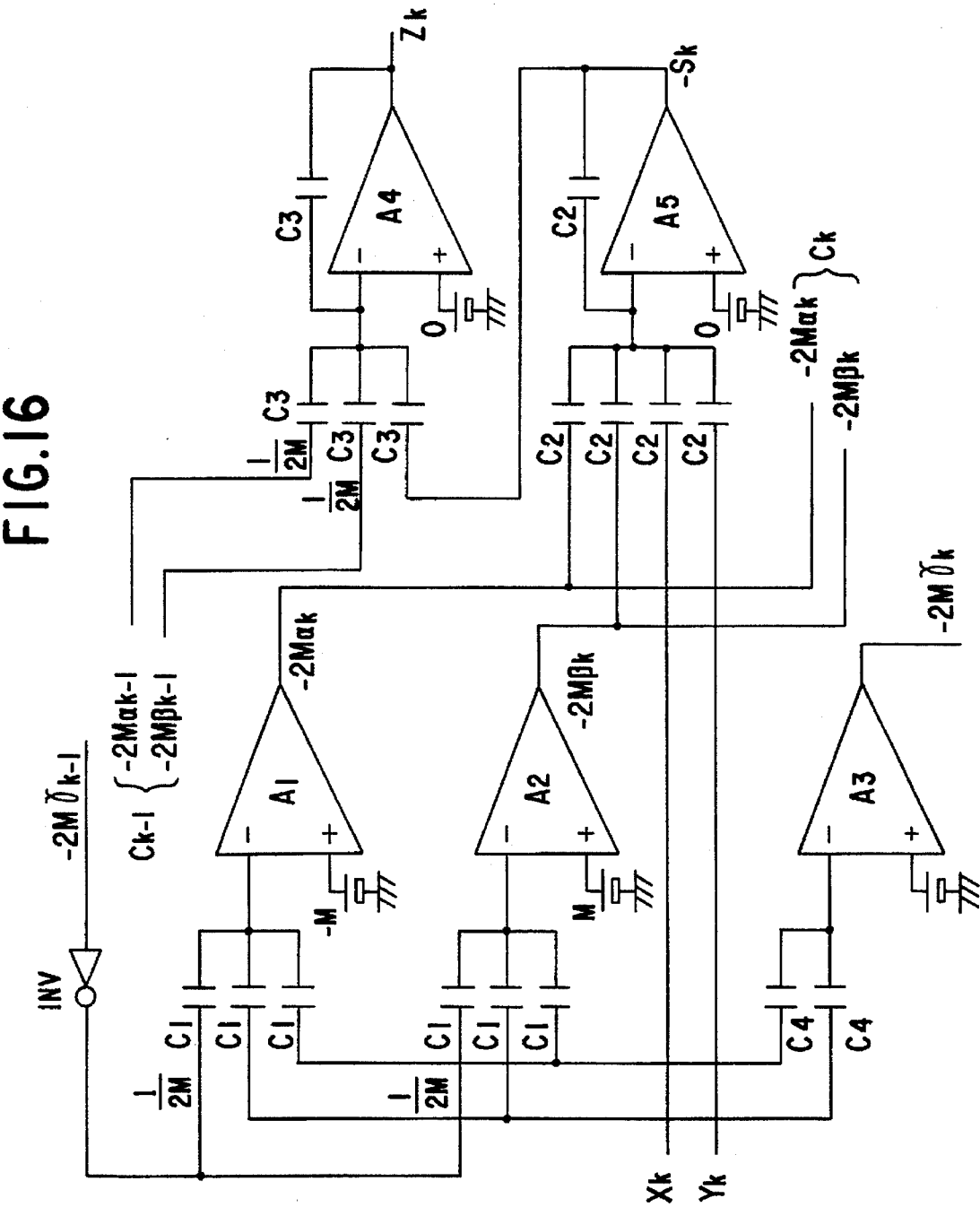
FIG. 16 is a circuit diagram of a part enclosed by a broken line shown in FIG. 15.

FIG. 16 is a circuit diagram of the part of the radix-R N-valued redundant adder enclosed by the broken line shown in FIG. 15. A multiple-input inverted comparator $A_1$ and a multiple-input inverted comparator $A_2$ generate the carry signal $c_k$, which is derived from the input signals $x_k$, $y_k$ and the sign $(-2M\delta_{k-1})$ of the intermediate sum $w_{k-1}$ and is propagated to the (k+1)th digit. A multiple-input inverted comparator $A_3$ generates, from the input signals $x_k$ and $y_k$, the sign $(-2M\delta_k)$ of the intermediate sum $w_k$ propagated to the (k+1)th digit. A multiple-input inverted amplifier $A_5$ calculates the sum signal $s_k$ $(=w_k-Rc_k)$. A multiple-input inverted amplifier $A_4$ calculates the final result $z_k$ from the sum signal $s_k$ and the carry signal $c_{k-1}$ from the (k−1)th.

The structure and operation of the adder shown in FIG. 16 will be described by using some equations.

In the adder shown in FIG. 16, the sum signal $w_k$ is derived, for each digit, from the following input signals $x_k$ and $y_k$:

$$x=\Sigma R^{k-1}x_k(x_k\epsilon\{-M, -(M-1), \ldots, M-1, M\})$$

$$y=\Sigma R^{k-1}y_k(y_k\epsilon\{-M, -(M-1), \ldots, M-1, M\}).$$

The intermediate sum $w_k$ is resolved into the sum signal $s_k$ ($s_k\epsilon\{-M, -(M-1), \ldots, M-1, M\}$) and the carry signal $c_k$ ($c_k\epsilon\{-1, 0, 1\}$). The final result $z_k$ ($z_k\epsilon\{-M, -(M-1), \ldots, M-1, M\}$) is obtained as the sum of the sum signal $s_k$ and the carry signal $c_{k-1}$. In this case, in order to fall the sum of $s_k$ and $c_{k-1}$ within a given range, it is necessary to produce the carry signal in the following way. That is, in the case where $|w_k|=M$, the carry signal $c_k$ is determined so that $s_k>0$ when $w_{k-1}<0$, and $s_k<0$ when $w_{k-1}\geq 0$.

In the circuit configuration, the comparator $A_3$ functions to make a decision on the sign of the intermediate sum. The comparator $A_3$ receives the input signals $x_k$ and $y_x$ through input capacitances $C_4$, and compares the sum thereof with a reference value. The comparison result given by the comparator $A_3$ is used to control the threshold values of the comparators $A_1$ and $A_2$ which are located one digit higher than the kth digit. The comparators $A_1$ and $A_2$ receive the signal $2M\delta_{k-1}$ indicative of the sign from the (k−1)th digit through an inverter INV and the corresponding capacitances connected to the comparators $A_1$ and $A_2$. The signal $2M\delta_{k-1}$ is the power supply voltage $V_{DD}$ or $V_{SS}$, and hence the input capacitance that receives the above signal is weighted so as to be ½M. In the above way, the carry signal is produced taking into account the intermediate sum at the (k−1)th digit.

The input capacitance of the amplifier $A_5$ that receives the carry signal is weighted so that R/2M=2M/2M=1. The input capacitances of the amplifier $A_4$ are determined as follows. While the weight of liner summation is identical for $s_k$ and $c_{k-1}$ the amplitude of the carry signals are −2M times as much as the original values. The capacitances that receive the carry signal $c_{k-1}$ of the (k−1)th digit are equal to (½M)$C_3$.

FIG. 17A shows the relation between the intermediate sum $w_k$ and the carry signal $c_k$, and FIG. 17B shows the relation between the intermediate sum $w_k$ and the sum signal $s_k$. FIG. 17C shows the relation between the intermediate sum $w_k$ and the component $\alpha_k$, and FIG. 17D shows the relation between the intermediate sum $w_k$ and the component $\beta_k$. FIG. 17E shows the relation between the intermediate sum $w_k$ and the signal $\delta_k$. In these figures, the solid lines indicate the case where $\delta_{k-1}=½$ and the broken lines indicate the case where $\delta_{k-1}=-½$.

As shown in FIG. 17A, the carry signal $c_k$ changes before or after ±M as a function of the intermediate sum $w_k$. Further, signal $\delta_k$ changes around 0. Hence, by setting the threshold values of the comparators $A_1$ and $A_2$ to −M and M, respectively, the value of the carry signal $c_k$ can be generated. The components $\alpha_k$ and $\beta_k$ are as shown in FIGS. 17C and 17D. The output signal $-s_k$ of the amplifier $A_5$ is equal to $-\{x_k+y_k-R(\alpha_k+\beta_k)\}$, and $s_k$ changes as shown in FIG. 17B.

As an example, a case where M=2 will now be considered. In the radix-4 5-valued redundant adder, the following is satisfied:

$$w_k=x_k+y_k=4c_k+s_k$$

Hence, the relation of the intermediate sum $w_k$, the carry signal $c_k$ and the sum signal $s_k$ is as shown in FIG. 18. When $w_k=\pm 2$, the values of $c_k$ and $s_k$ are as follows. When $w_k=-2$ and $\delta_{k-1}=-½$, $c_k=-1$, then $s_k=2$. When $w_k=-2$ and $\delta_{k-1}=½$, $c_k=0$, then $s_k=-2$. When $w_k=2$ and $\delta_{k-1}=-½$, $c_k=0$, then $s_k=2$. When $w_k=2$ and $\delta_{k-1}=½$, $c_k=1$, then $s_k=-2$. Hence, when $w_k=\pm 2$, it is necessary to select $c_k$ depending on $\delta_{k-1}$.

It will now be assumed that $\delta_k$ is as follows:

$$\gamma_k = \begin{cases} -1/2 & (w_k < 0.5) \\ 1/2 & (w_k \geq -0.5) \end{cases}$$

In this case, the components $\alpha_k$ and $\beta_k$ of the carry signal $c_k$ are selected as follows:

$$\alpha_k = \begin{cases} -1/2 & (w_k + \gamma_{k-1} < -2) \\ 1/2 & (w_k + \gamma_{k-1} \geq -2) \end{cases}$$

$$\beta_k = \begin{cases} -1/2 & (w_k + \gamma_{k-1} < 2) \\ 1/2 & (w_k + \gamma_{k-1} \geq 2) \end{cases}$$

As described above, by setting the threshold values of the comparators $A_1$ and $A_2$, it is possible to determine the value of the carry signal $c_k$. The outputs of the comparators $A_1$ and $A_2$ are either the power supply voltage $V_{DD}$ or $V_{SS}$. The voltage $V_{DD}$ corresponds to +2 (=M) in the 5-valued notation (M=2), and $V_{SS}$ corresponds to −2 (=−M). The amplitude of the outputs is −2M times as much as the original value. The weight of linear summation for the carry signals is R (=2M). Hence, the input capacitances of the amplifier $A_5$ are equal to $C_2$.

The linear summation for $s_k$ and $c_{k-1}$ are equally weighted. When M=2, the carry signals corresponding to $c_{k-1}$ from the (k−1)th digit is equal to four times the original value thereof. Hence, the two capacitances that receive the carry signal $c_{k-1}$ are weighted so as to be equal to ¼ the capacitance $C_3$ that receives the sum signal $-s_k$.

The description of the redundant adder shown in FIGS. 16 and 17A through 17D is related to the case where the SD code which assumes the symmetrical negative and positive values in each digit is used. Other adders can be configured in the same way as described above when using a code having asymmetrical values in each digit (for example, radix-2M (2M+1)-valued code assuming only positive values such as $x_k\epsilon\{0, \ldots, 2M\}$.

In the configurations shown in FIGS. 12 and 6, it is possible to prevent an error in the multiple-level formation from being accumulated by utilizing a quantizer (made up of plural discriminators (comparators), each making a decision on in which one of the multiple levels the voltage $z_k$ falls, and a multiple-input amplifier which linearly adds the outputs of the discriminators) which receives the final result $z_k$.

The quantizer as described above can be provided within the adder shown in FIG. 12 or FIG. 14. For example, a quantizer which quantizes the input signals $x_k$ and $y_k$ is provided so that the output signals of the quantizer are used as the input signals $x_k$ and $y_k$ shown in FIGS. 12 and 16.

It is also possible to quantize the sum $-s_k$. Since $S_k$ is the (2M+1)-valued, the above quantizing way is superior, in the radix-2M (2M+3)-valued adder, to a case where the signals $z_k$, $x_k$ and $y_k$ are quantized because a smaller number of comparators is used to form the quantizer.

As described above, use of the quantizer contributes to reducing accumulation of errors in the multi-level formation. This will now be described below in detail.

In the above-mentioned redundant adders, the front stage outputs a binary level (high or low level) dependent on the weight, and the rear stage outputs the multiple-valued signal due to the analog operation utilizing the feedback structure. The potential of the floating gate is determined by the weighted average of input voltages. When the amplifier is constructed by the CMOS circuit, the response to the output signal to the input signal is not linear in the vicinity of the power supply voltages ($V_{DD}$ and $V_{SS}$), Hence, an error will occur if the input voltage is at a level which produces the output voltage near the power supply voltages. Further an error introduced during the production of the capacitances leads to an error contained in the output signal. In order to avoid the occurrence of the above errors, the above-mentioned quantizer is used.

The quantizer is intended to avoid error generated in the analog process. Hence, the quantizer may be provided on the output side of the multiple-input amplifier having the feedback capacitance. In this case, the quantizer makes a level decision on the multiple-valued output signal of the multiple-input amplifier, and then the add operation is performed again. Hence, the total process is not efficient. Embodiments of the present invention which will be described below are configured taking into account the above.

The embodiments of the present invention which will be described below have an internal function of making a decision as to at which one of the multiple levels the voltage is.

Figure 19:
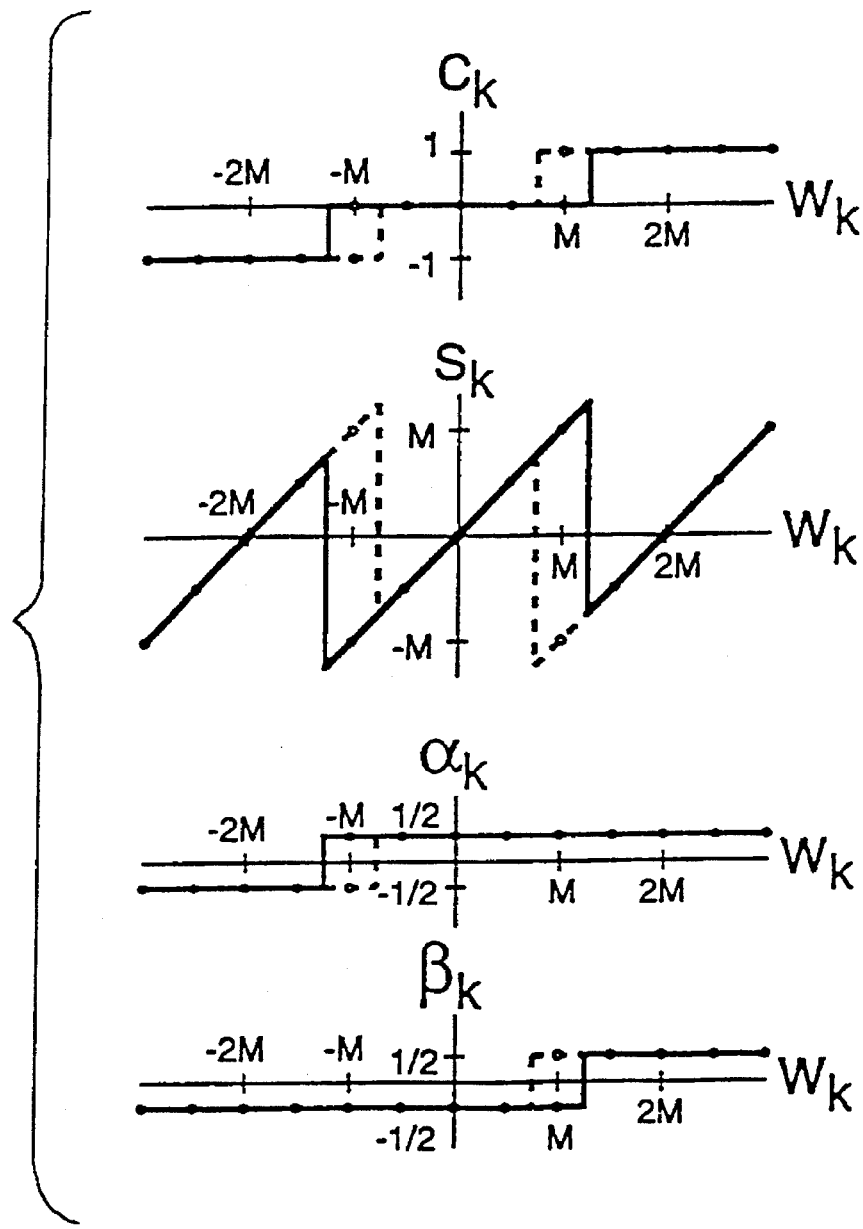
FIG. 19 shows graphs of a first part for explaining a radix-2M (2M+3)-valued redundant adder.
Figure 20:
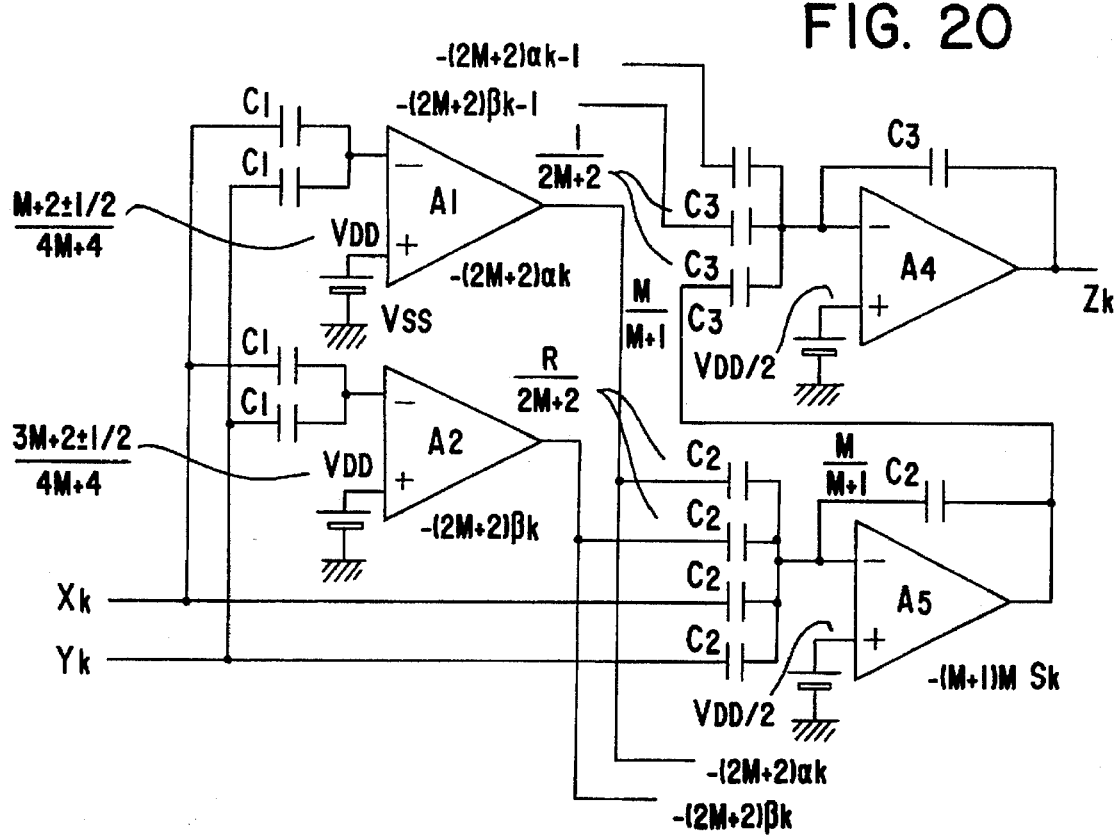
FIG. 20 is a diagram of a second part for explaining the radix-2M (2M+3)-valued redundant adder.

FIGS. 19 through 22 are diagrams for explaining the radix-R (2M+3)-valued redundant adder. It will be noted that some figures are the same as those in the foregoing. More particularly, FIG. 19 shows signals of parts of the redundant adder, and FIG. 20 shows the principle of the adder. FIGS. 19 and 20 have been described previously. However, the configuration shown in FIG. 20 has a feedback capacitance of $\{M/(M+1)\}C$ of the multiple-input amplifier $A_3$ and a coupling capacitance $\{M/(M+1)\}C_3$ between the output of the amplifier $A_3$ and the next stage. This is due to the following factors. The signals $x_k$, $y_k$, $z_k$ are (2M+3)-valued signals, while $s_k$ is the (2M+1)-valued signal. The gain with respect to the signals $x_k$ and $y_k$ is set equal to (M+1)/M so that the sum $-s_k$ can swing over the full amplitude range. Of course, there is no problem when using the capacitances $C_2$ and $C_3$. In some cases, it would be better for the signal to swing over the full amplitude range due to the CMOS inverter characteristic.

Figure 21:
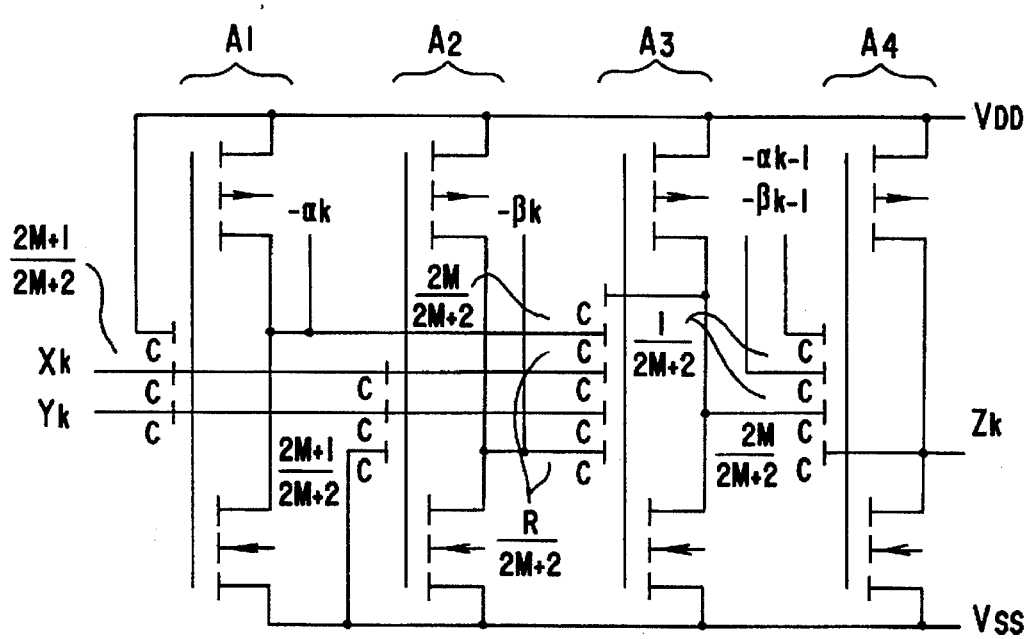
FIG. 21 is a diagram of a third part for explaining the radix-2M (2M+3)-valued redundant adder.

FIG. 21 is a circuit diagram of the radix-2M (2M+3)-valued redundant adder using neuron-CMOS circuits. In the circuit shown in FIG. 21, the threshold voltages of the neuron-MOS inverters are equal to $V_{DD}/2$. The symbol "+" corresponds to the solid lines shown in FIGS. 19A through 19D, and the symbol "–" corresponds to the broken lines shown therein. In the circuit shown in FIG. 21, the output signal $z_k$ are produced by the input signals $x_k$ and $y_k$ through the multiple-input amplifiers. Hence, an error due to the analog operation may be accumulated in a subsequent stage because plural multiple-input amplifiers are used. In order to avoid this problem, as has been described previously, a quantizer can be provided on the input or output side of the adder or in an intermediate circuit portion thereof in order to reproduce the multiple-level signals. The two input signals are applied to the adder, two quantizers are needed to quantize the two input signals. This is not efficient. Meanwhile, the level of the output signal of the adder is the (2M+3)-valued signal, while the sum $s_k$ is the (2M+1)-valued signal. Hence, it is most efficient to provide a single quantizer to receive the sum $s_k$. The quantizer may be formed of comparators arranged in parallel or may have an arrangement in which the output signal of a comparator is applied to another comparator.

The quantizer operates so that the signal level is detected by the comparators to thereby produce a pair of binary signals, which are changed again to the multiple-level signal by summing the pair of binary signals. When the quantizer is used to follow the sum $s_k$, it is necessary to add the carry signal to the output signal of the quantizer by using a multiple-input amplifier. This is redundant, whereas it is advantageous to add the output signals of the comparators and the carry signal at one time. It will be noted that the multiple-input amplifier for generating the sum signal $s_k$ functions as a comparator when removing the feedback capacitance. Hence, it is possible to replace such a multiple-input amplifier by comparators of the quantizer.

Figure 22:
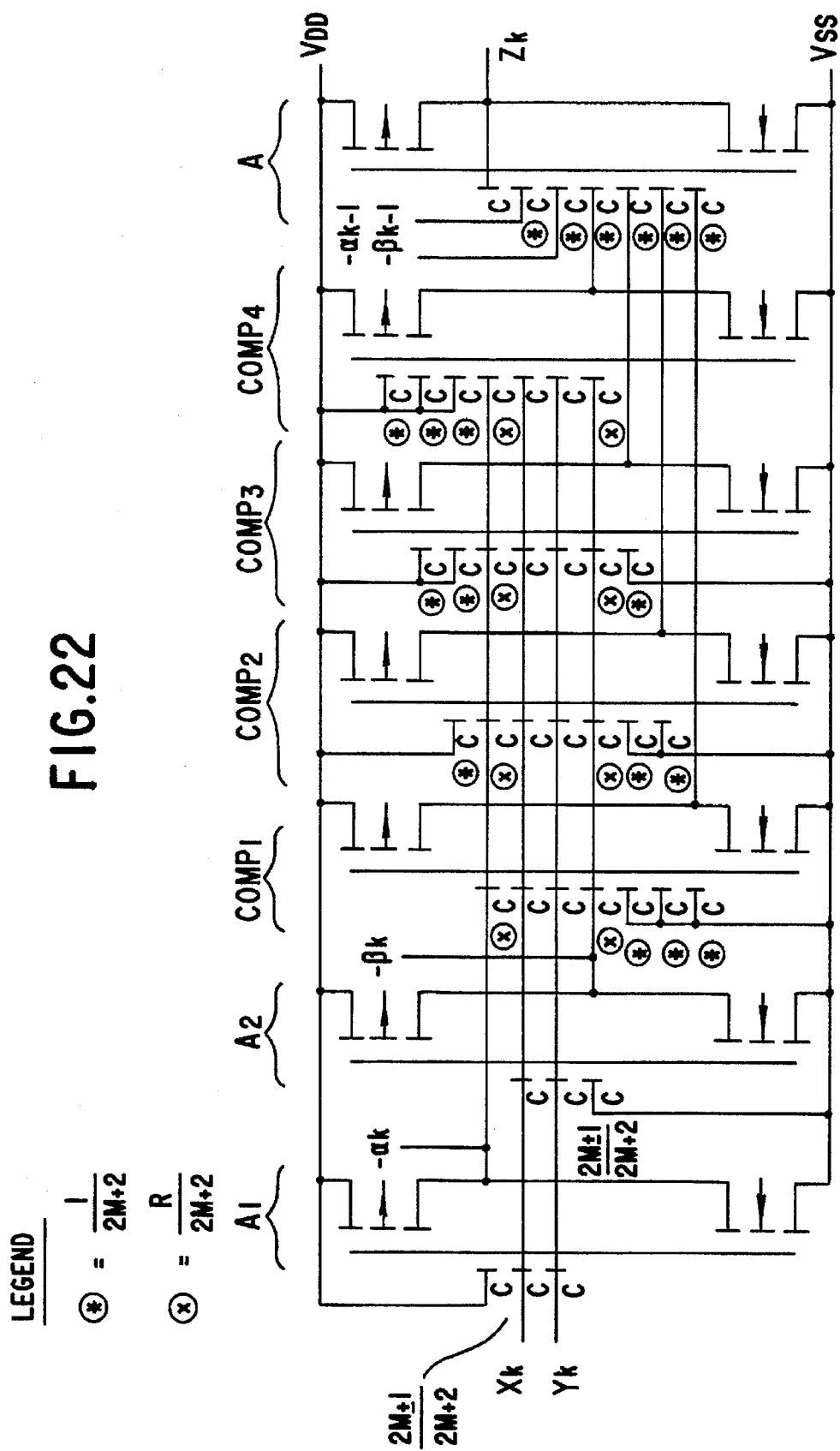
FIG. 22 is a diagram of a fourth part for explaining the radix-2M (2M+3)-valued redundant adder.

FIG. 22 shows a circuit of the radix-2M (2M+3)-valued redundant adder (M=2) configured taking into account the above consideration. The adder shown in FIG. 22 has an internal quantizing function, and thus there is no problem about accumulation and propagation of an error. In the circuit shown in FIG. 22, the signals $(s_k=x_k+y_k-2M(\alpha_k+\beta_k))$ are added and discriminated by 2M comparators (four comparators in FIG. 22) $COMP_1$, $COMP_2$, $COMP_3$ and $COMP_4$ connected in parallel. The output signals and the carry signals $\alpha_{k-1}$ and $\beta_{k-1}$ of the comparators are added by the final-stage multiple-input amplifier A. The output signals and carry signals $\alpha_{k-1}$ and $\beta_{k-1}$ of the comparators are all considered as signals which take ±0.5, and are all weighted equally. In the configuration shown in FIG. 22, the four comparators $COMP_1$, $COMP_2$, $COMP_3$ and $COMP_4$ having an identical structure are arranged in parallel, and some input terminals thereof used to set the respective threshold values are connected to either the power supply voltage $V_{DD}$ or $V_{SS}$. For example, three input terminals among seven input terminals of the comparator $COMP_1$ are supplied with the power supply voltage $V_{SS}$. Except for the highest-order and lowest-order comparators $COMP_1$ and $COMP_4$, the comparators $COMP_2$ and $COMP_3$ have input terminals connected to the power supply voltages $V_{DD}$ and $V_{SS}$. Hence, some input terminals may be canceled so that the number of capacitances can be reduced. A comparator having a multiple-stage formation may be used. The carry signal $c_{k-1}$ and the four output signal lines respectively extending from the four comparators $COMP_1$, $COMP_2$, $COMP_3$ and $COMP_4$ are connected to input terminals of the multiple-input amplifier A.

The final-stage multiple-input amplifiers $A_4$ (shown in FIG. 21) and A (FIG. 22) may be replaced by neuron-MOS source-follower circuits. In this case, the final-stage amplifiers output the inverted levels. However, a multiplier using multiple-valued redundant adders has an orderly arranged tree structure. Hence, a serious problem will not be caused by the presence of the inverted output level.

The configuration described with reference to FIGS. 19 through 22 will be applied to a radix-(2M+1) (2M+3)-valued redundant adder without any modification. In this case, R assumes 2M+1.

Figure 23:
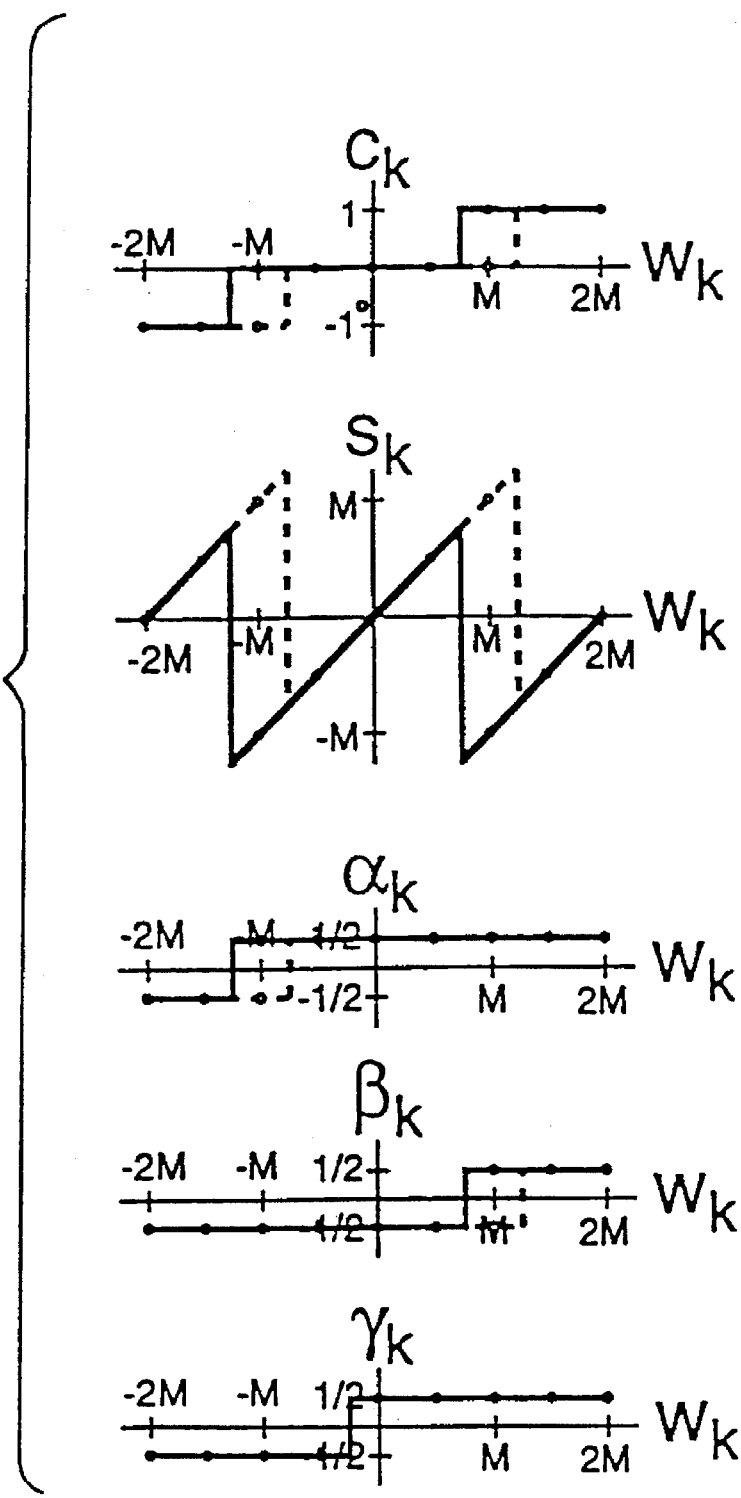
FIG. 23 shows graphs of a first part for explaining a radix-2M (2M+1)-valued redundant adder.
Figure 24:
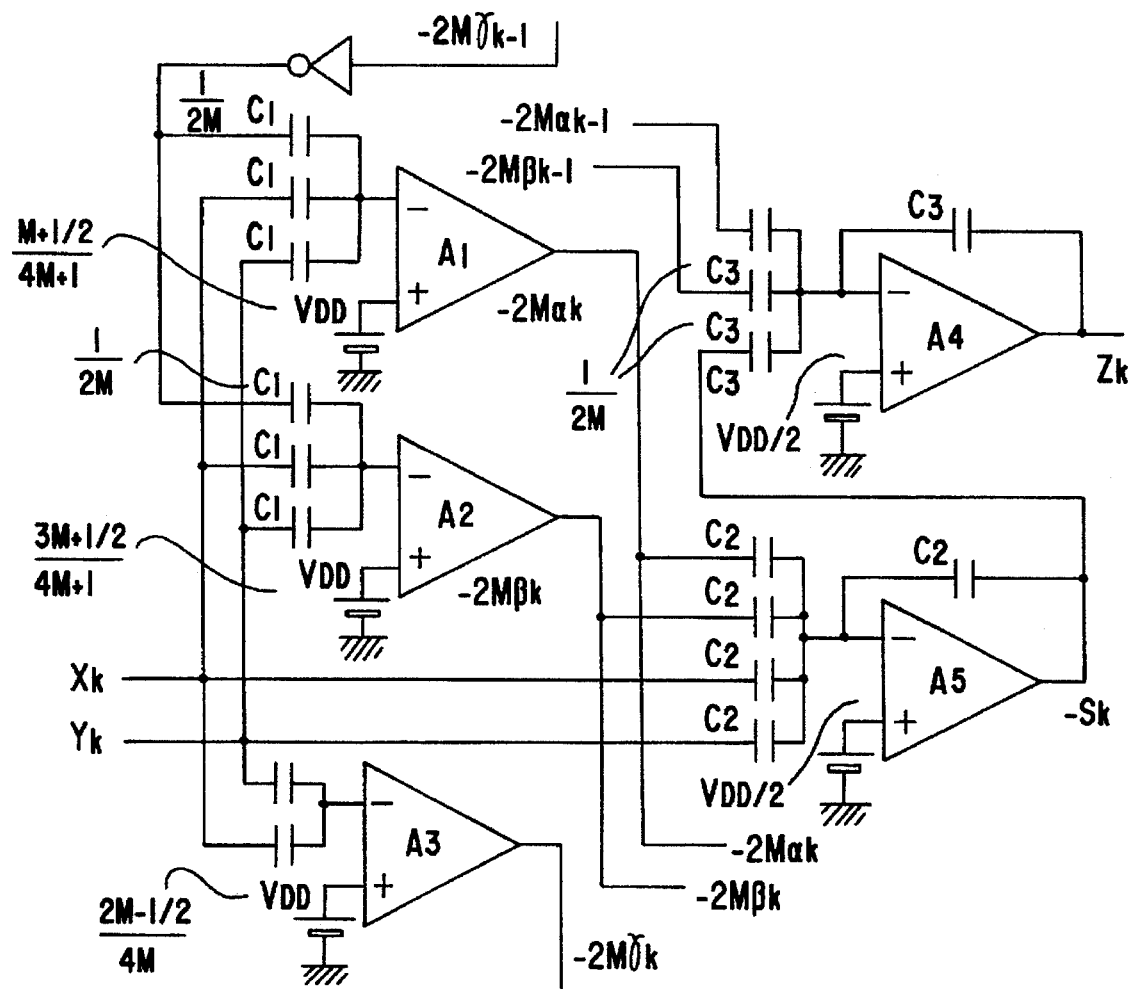
FIG. 24 is a diagram of a second part for explaining the radix-2M (2M+1)-valued redundant adder.
Figure 25:
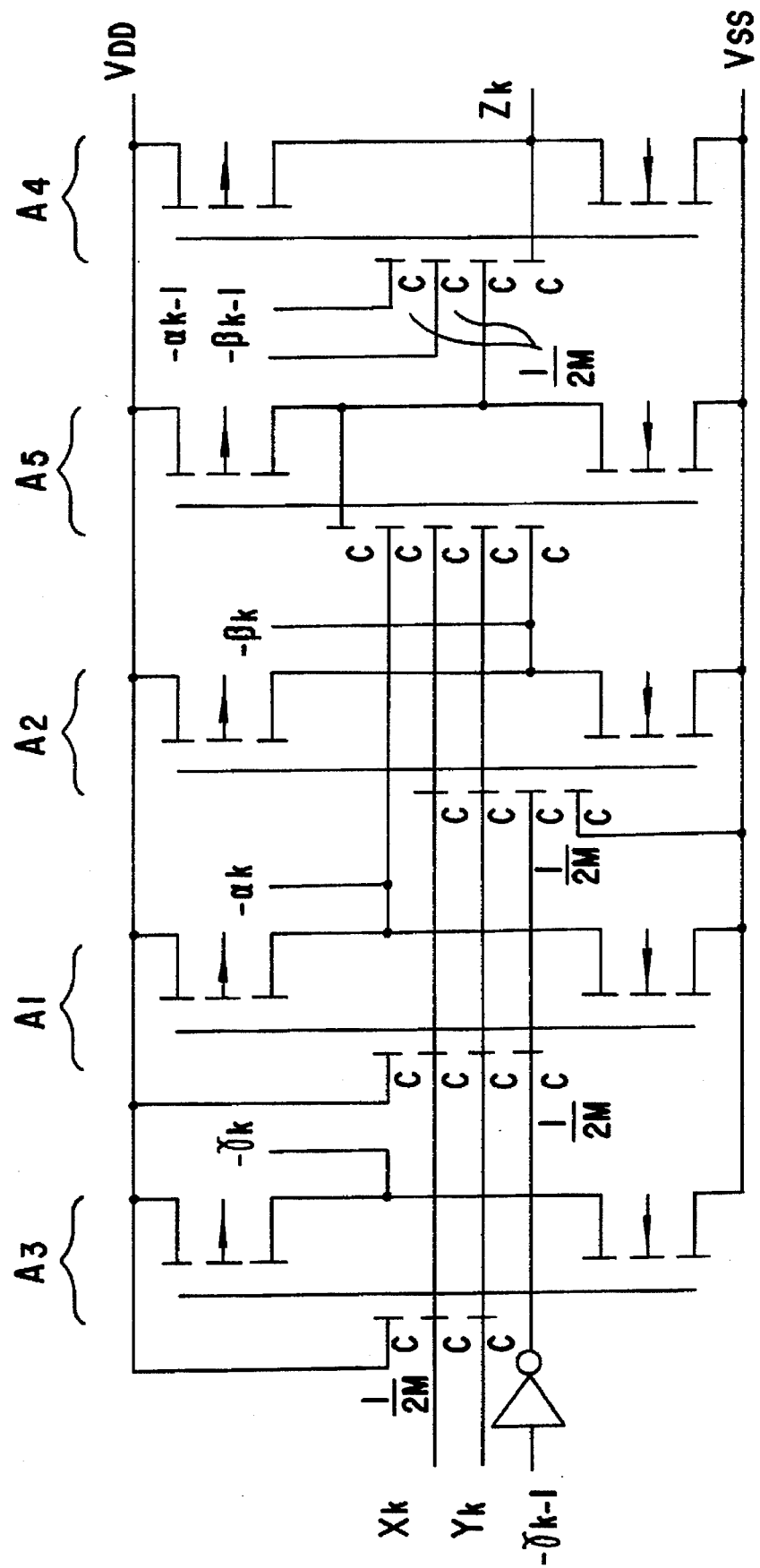
FIG. 25 is a diagram of a third part for explaining the radix-2M (2M+1)-valued redundant adder.

FIGS. 23 through 26 are diagrams for explaining a radix-2M (2M+1)-valued redundant adder. FIG. 23 is the same as FIGS. 17A through 17D, and the circuit configuration shown in FIG. 24 is substantially the same as that shown in FIG. 16. FIG. 25 shows a circuit configuration using neuron-MOS circuits including CMOS inverters. The circuit shown in FIG. 25 is configured based on the same concept as the aforementioned radix-2M (2M+1)-valued redundant adder.

Figure 26:
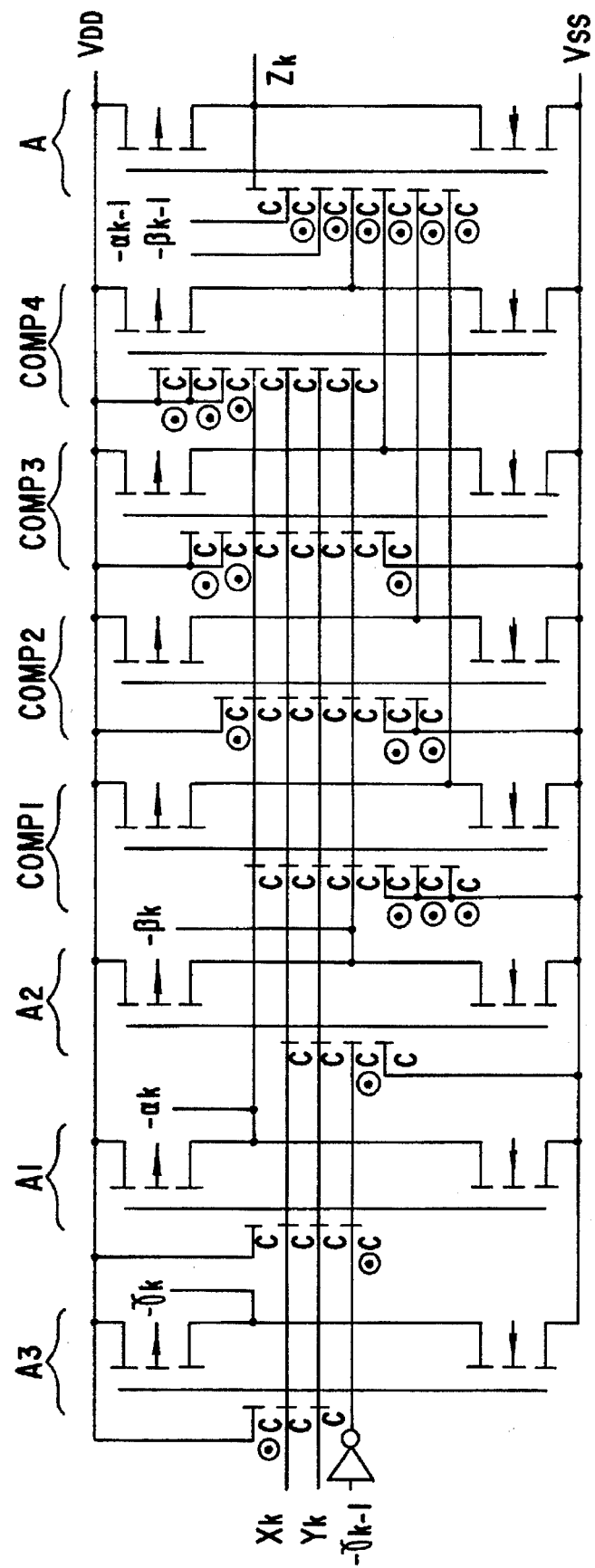
FIG. 26 is a diagram of a fourth part for explaining the radix-2M (2M+1)-valued redundant adder.

FIG. 26 is a circuit diagram of the adder including an internal quantizing function. The circuit shown in FIG. 26 is configured based on the same concept as the radix-2M (2M+3)-valued redundant adder. As shown in FIG. 26, four (2M) comparators (M−2) COMP$_1$, COMP$_2$, COMP$_3$ and COMP$_4$ are arranged in parallel and each of the threshold value setting input terminals thereof is connected to either the power supply voltage V$_{DD}$ or V$_{SS}$. In the configuration shown in FIG. 26, it is not possible to replace the multiple-input amplifier A located at the final stage cannot be replaced by a neuron-MOS source-follower circuit.

Figure 27:
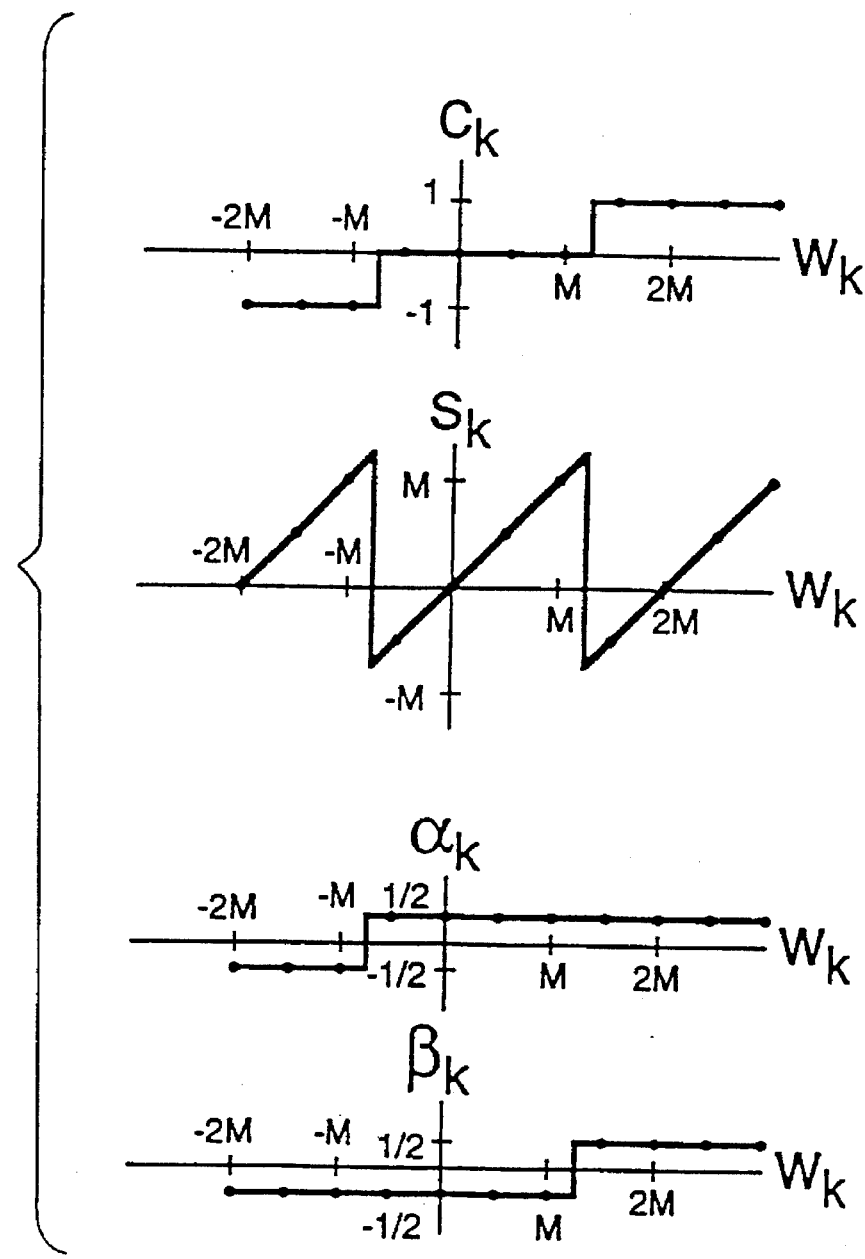
FIG. 27 shows graphs of a first part for explaining a radix-2M (2M+2)-valued redundant adder.
Figure 28:
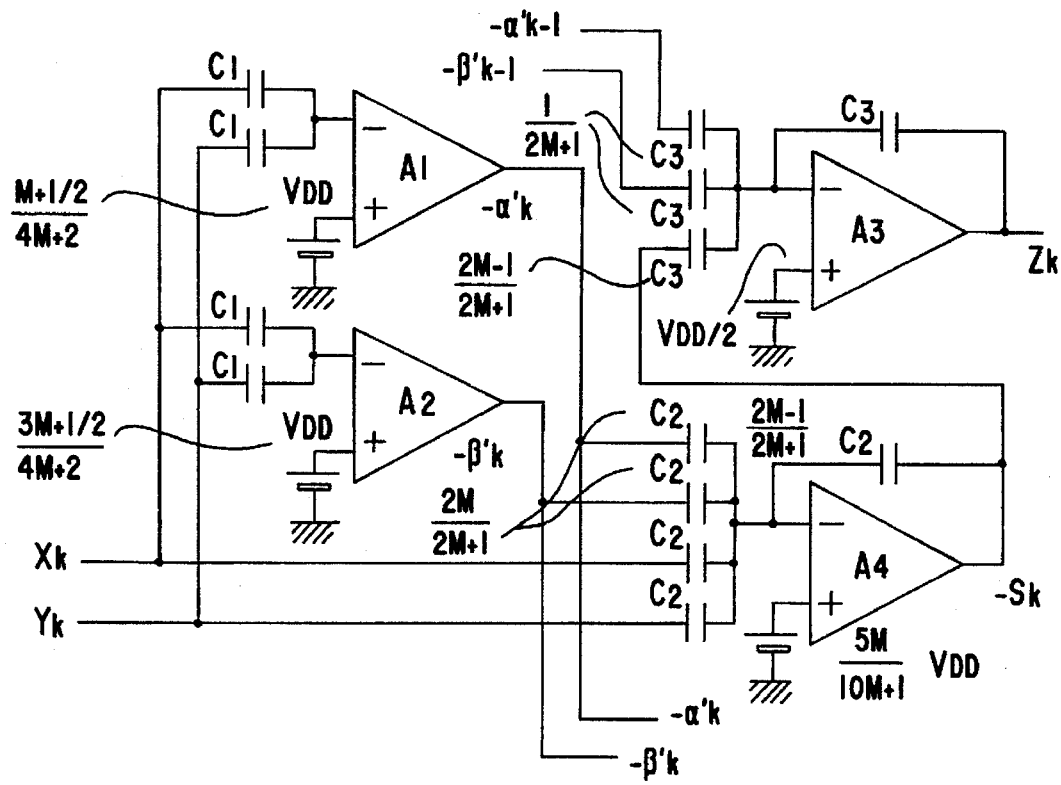
FIG. 28 is a diagram of a second part for explaining the radix-2M (2M+2)-valued redundant adder.

FIGS. 27 through 30 are diagrams explaining a radix-2M (2M+2)-valued redundant adder, which takes multiple values between −M and M+1. When the signals $s_k$ and $c_k$ are generated as shown in FIG. 27, then $S_k \in \{-M+1, -M+2, \ldots, M-1, M\}$ and $c_k \in \{-1, 0, 1\}$. Then, the sum z of the signals $s_k$ and $c_k$ is such that $z_k \in \{-M, -M+1, \ldots, M, M+1\}$. As will be seen from the above, the adder shown in FIGS. 27 through 30 does not have propagation of the carry signal as in the case of the radix-2M (2M+3)-valued redundant adder. The adder shown in FIGS. 27 through 30 differs from the radix-2M (2M+3)-valued redundant adder only in that the symmetry of the sign is abandoned to reduce multiple levels by one level.

Figure 29:
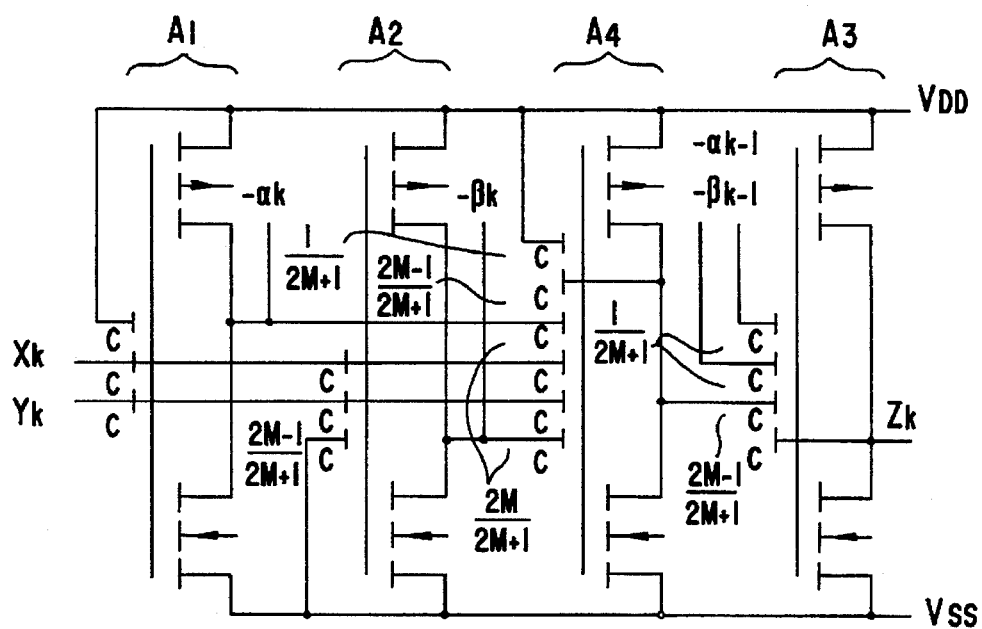
FIG. 29 is a diagram of a third part for explaining the radix-2M (2M+2)-valued redundant adder.
Figure 30:
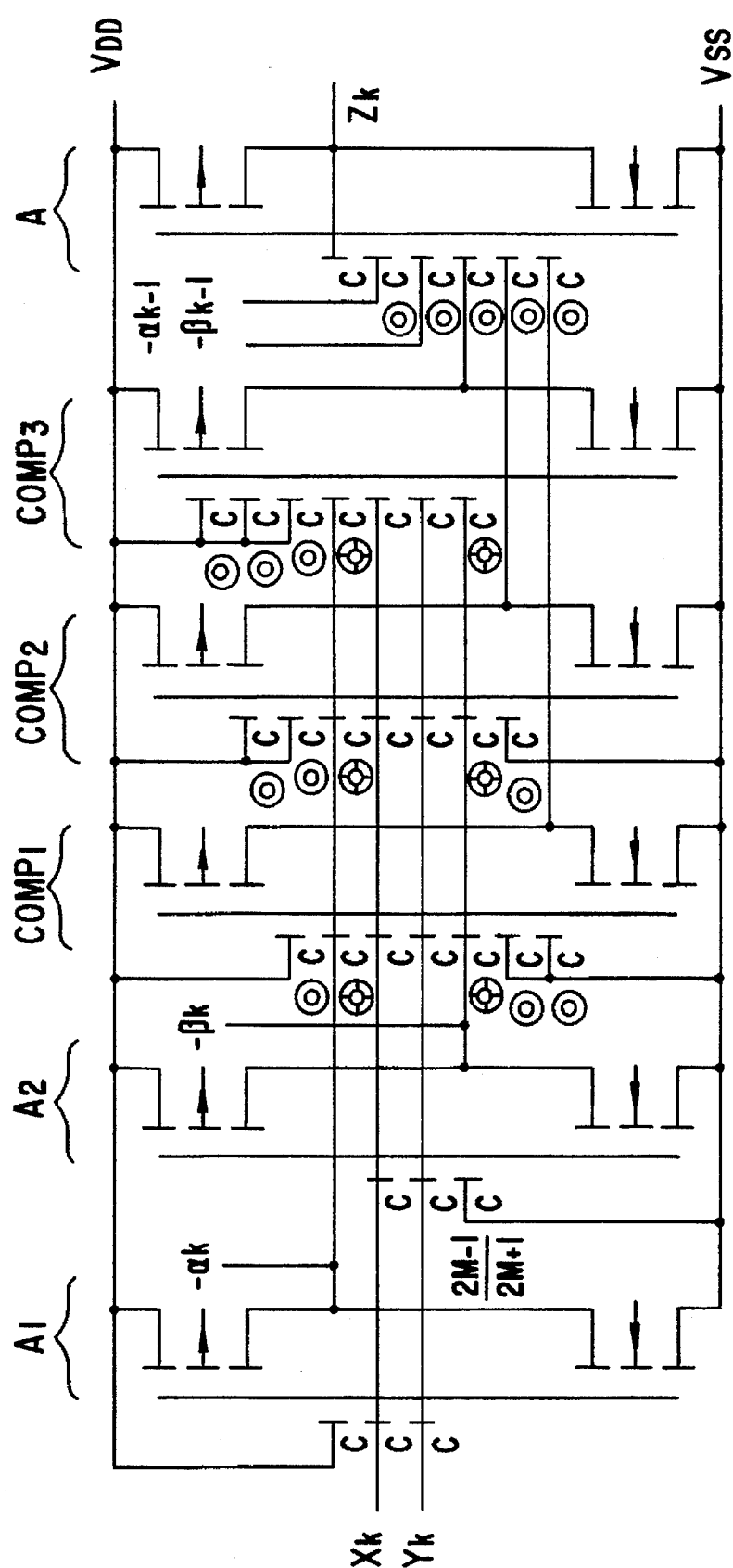
FIG. 30 is a diagram of a fourth part for explaining the radix-2M (2M+2)-valued redundant adder.

Basically, the configurations shown in FIGS. 29 and 30 are similar to those of the radix-2M (2M+3)-valued redundant adder. As shown in FIG. 27, the threshold values are not symmetrical with respect to the sign, and it is thus necessary to pay attention to the setting of the threshold values. The signal $s_k$ of the radix-2M (2M+2)-valued redundant adder is a 2M-valued signal, which is different from that of the radix-2M (2M+3)-valued redundant adder. Hence, the number of the comparators used in the radix-2M (2M+2)-valued redundant adder is less than those of the radix-2M (2M+3)-valued redundant adder. The multiple-valued amplifier A provided at the final stage can be replaced by a neuron-MOS source-follower circuit.

FIGS. 31 through 34 show an improvement in the radix-2M (2M+1)-valued redundant adder shown in FIGS. 23 through 26. As has been described previously, in the radix-2M (2M+1)-valued redundant adder, it is necessary to change the threshold values for generating the carry signal in accordance with the signal $\delta_{k-1}$ indicative of the sign (+ or −) of the intermediate sum at the digit k−1. Hence, in the configurations shown in FIGS. 23 through 26, the signals $\alpha_k$ and $\beta_k$ are produced by applying the sum of the intermediate signal $w_k$ and the sign indicating signal $\delta_{k-1}$ to the comparators A$_1$ and A$_2$. This suggests that when a signal is added to $w_k+\delta_{k-1}$, the input/output characteristic thereof can become constant.

Figure 31:
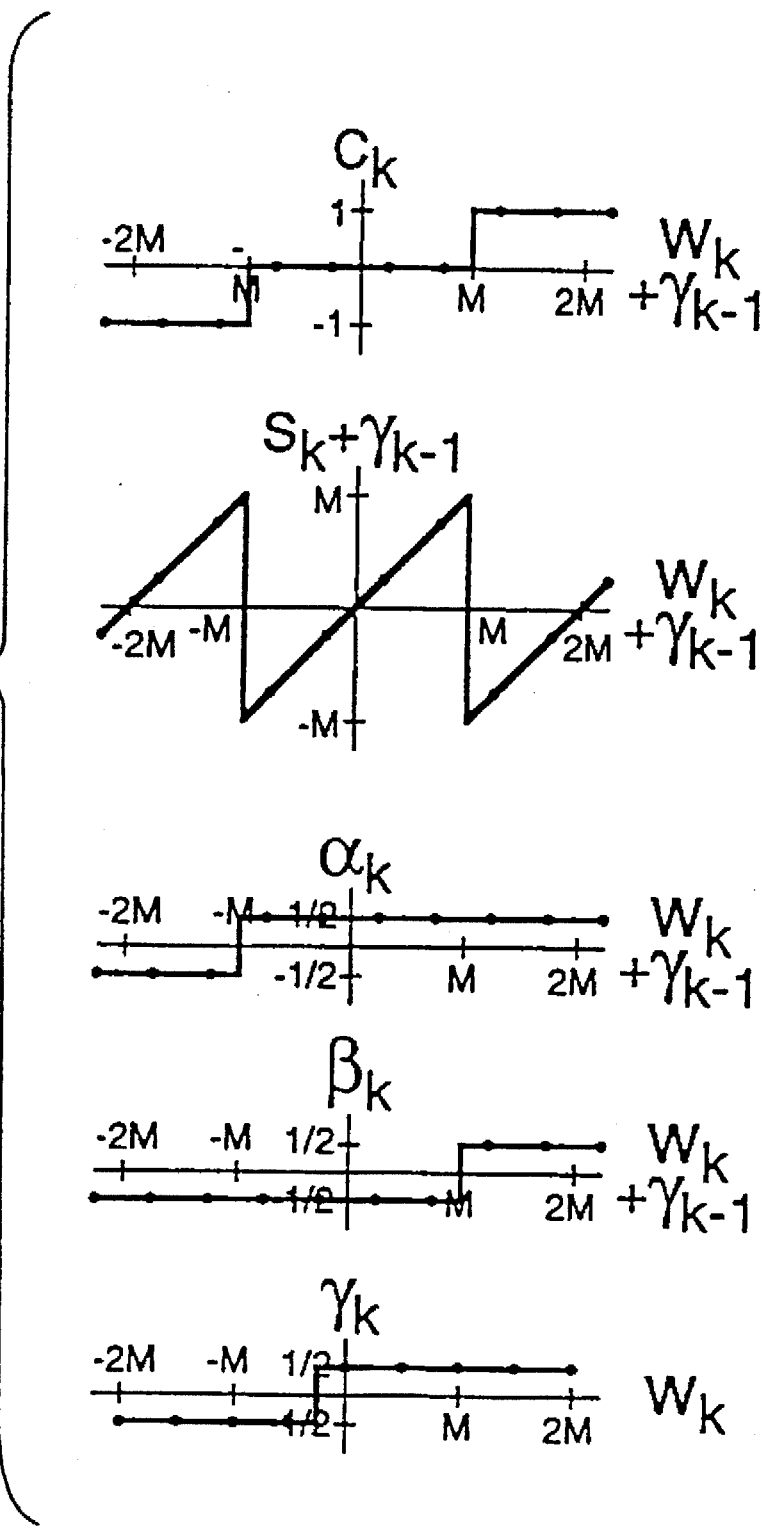
FIG. 31 shows graphs of a first part for explaining an improvement in the radix-2M (2M+1)-valued redundant adder shown in FIGS. 23 through 26.
Figure 32:
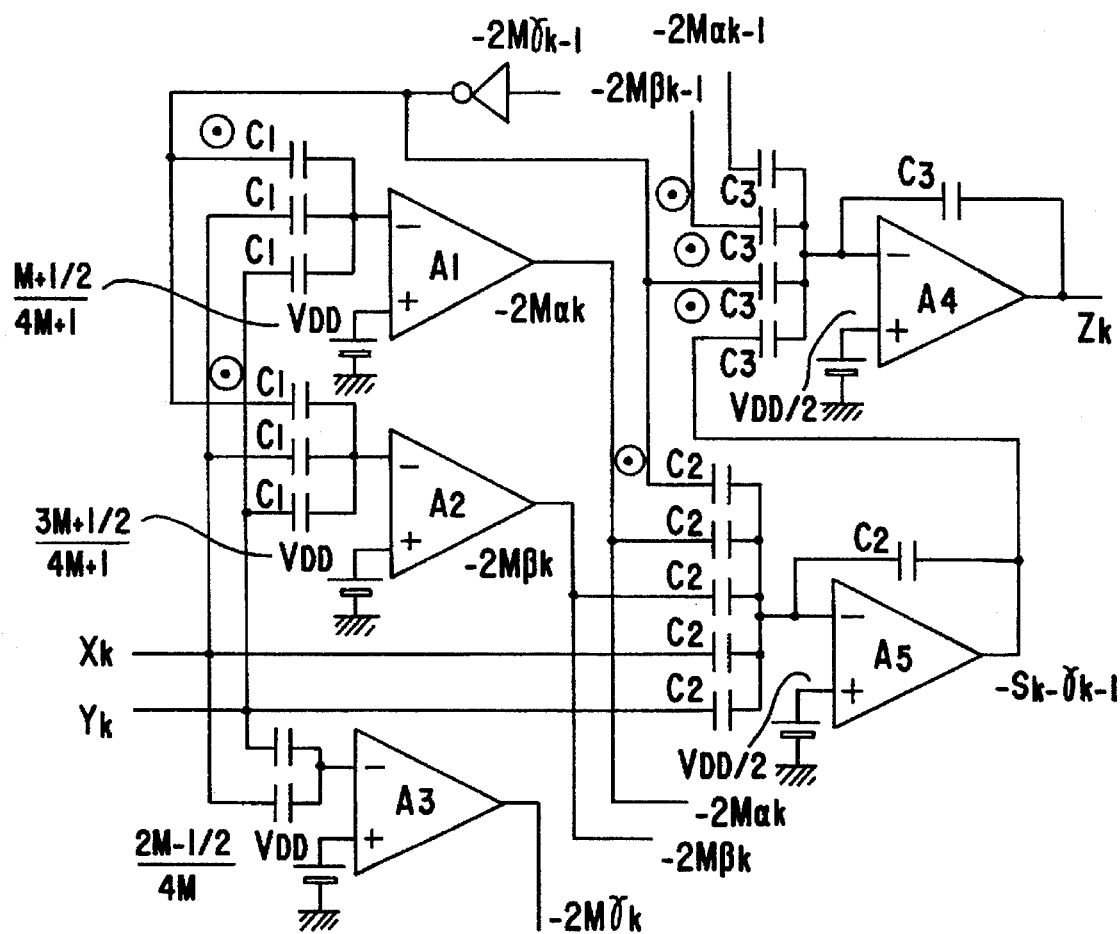
FIG. 32 is a diagram of a second part for explaining the improvement in the radix-2M (2M+1)-valued redundant adder shown in FIGS. 23 through 26.

FIG. 31 shows the above. With respect to $w_k+\delta_{k-1}$, the sum $s_k+\delta_{k-1}$ has a constant characteristic, and is a 2M-valued signal. FIG. 32 shows the adder based on the above principle. In the configuration shown in FIG. 32, the sign indicating signal $\delta_{k-1}$ is added to not only the comparator A$_1$ and A$_2$ but also the multiple-input amplifier A$_5$ of the following stage, so that the output signals $-s_k-\delta_{k-1}$ are obtained. Further, by applying the signal $\delta_{k-1}$ to the multiple-input amplifier A$_4$ of the final stage, the unnecessary signal $\delta_{k-1}$ is canceled.

Figure 33:
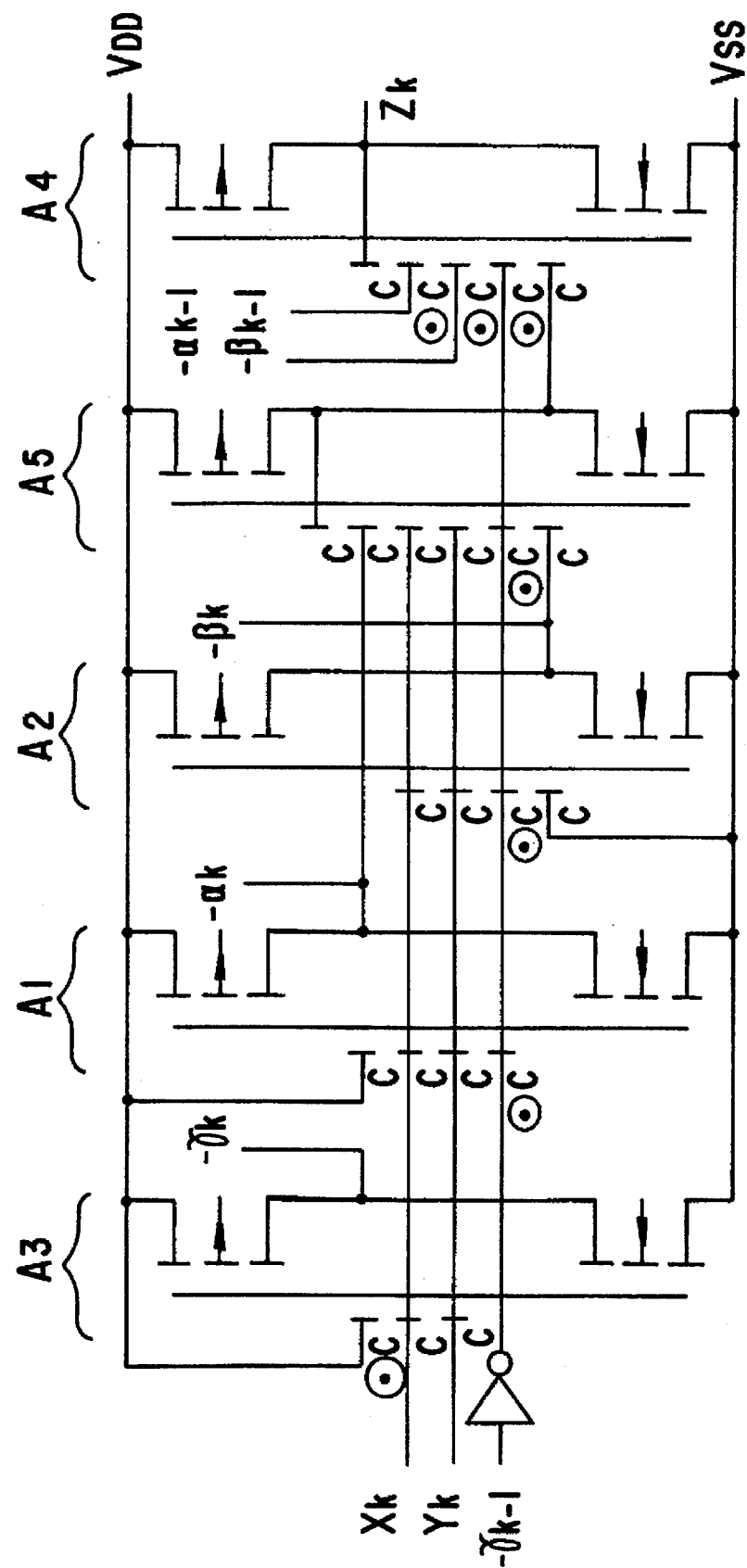
FIG. 33 is a diagram of a third part for explaining the improvement in the radix-2M (2M+1)-valued redundant adder shown in FIGS. 23 through 26.
Figure 34:
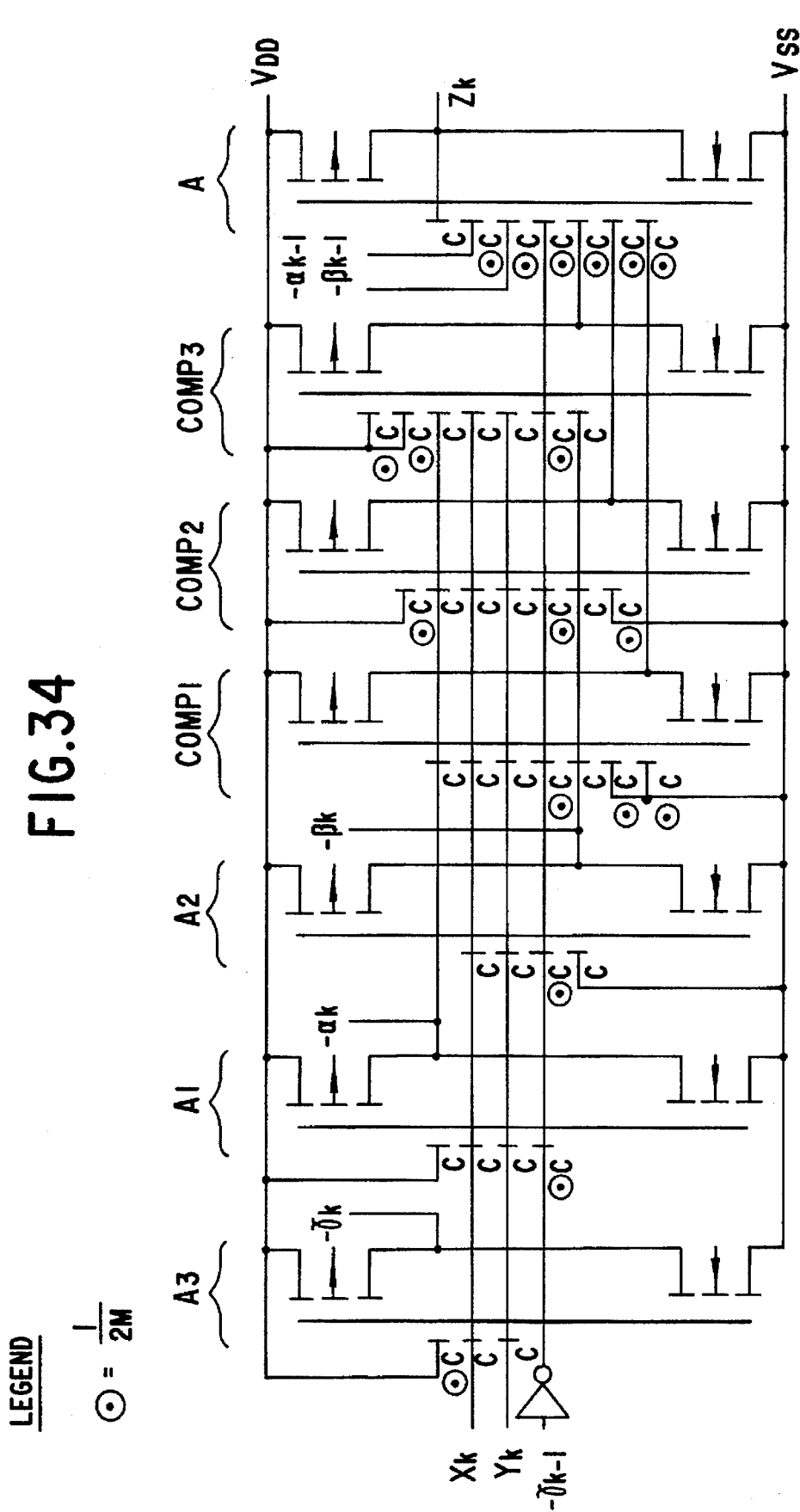
FIG. 34 is a diagram of a fourth part for explaining the improvement in the radix-2M (2M+1)-valued redundant adder shown in FIGS. 23 through 26.

FIGS. 33 and 34 show circuit configurations based on the above principle. As compared to the configurations shown in FIGS. 23 through 26, the number of comparators is reduced because the signal $s_k+\delta_{k-1}$ is a 2M-valued signal.

Figure 35:
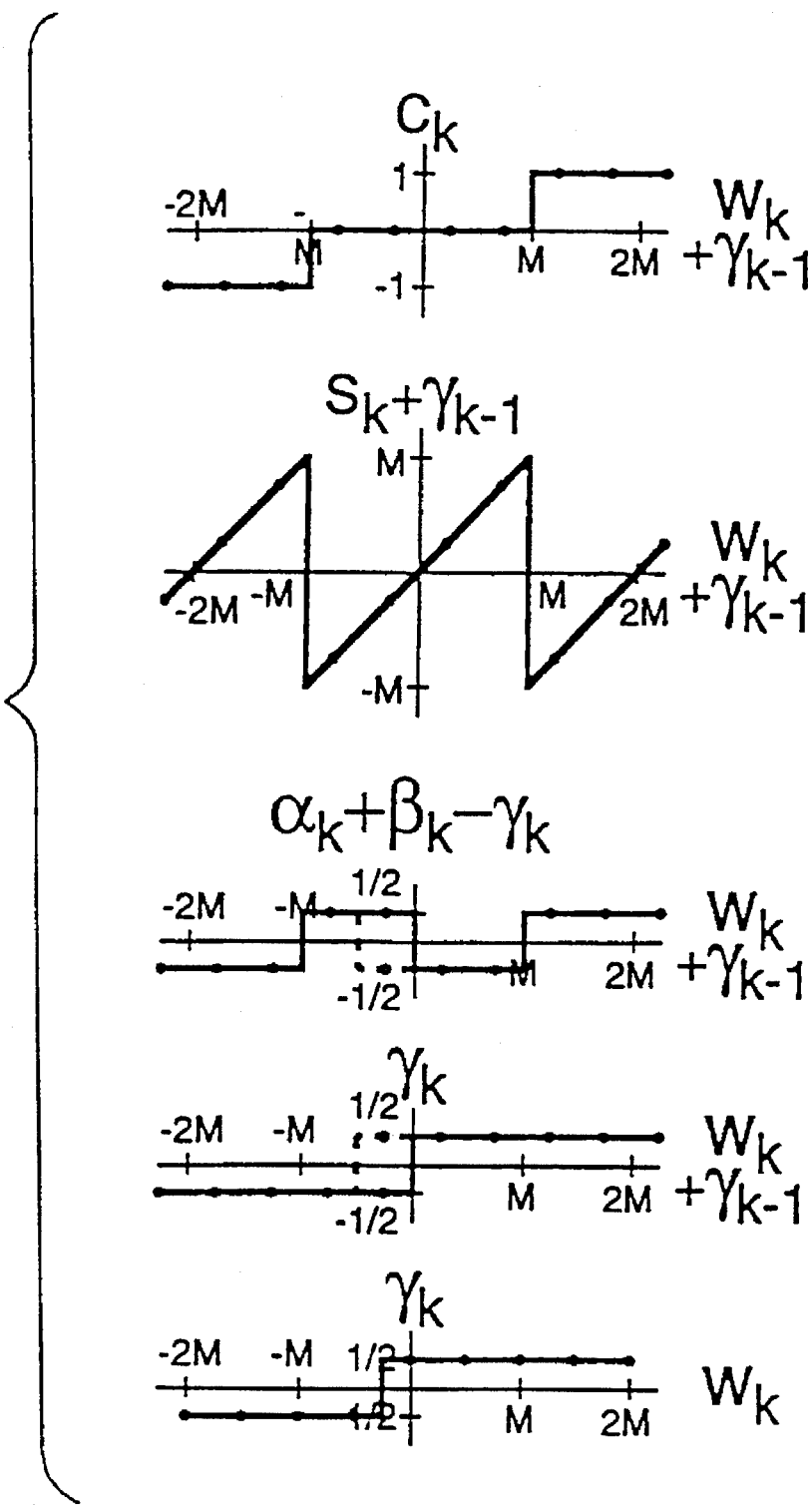
FIG. 35 shows graphs of a first part for explaining a further improvement in the radix-2M (2M+1)-valued redundant adder shown in FIGS. 31 through 34.

FIGS. 35 through 38 show a further improvement in the radix-2M (2M+1)-valued redundant adder shown in FIGS. 31 through 34. It can be seen from FIG. 31 that the signals $\alpha_k$, $\delta_k$ and $\beta_k$ and rise in this order without exception and there are only four combinations thereof. Hence, these signals can be integrated to two binary signals. FIG. 35 shows the above. The necessary information $\delta_k$ and $c_k=\alpha_k+\beta_k$ can be produced from two binary signals $\delta_k$ and $\alpha_k+\beta_k-\delta_k$. In order to produce $\alpha_k+\beta_k-\delta_k$, it is possible to utilize the fact that the threshold values for the signals $\alpha_k$ and $\beta_k$ are symmetrical with respect to the sign of the sum $w_k+\delta_{k-1}$. By applying the output $-\delta_k$ to the comparator A$_1$ for producing the carry signal, it is possible to operate a comparator in which the threshold value for $\beta_k$ is selected when the signal $\delta_k$ is positive, and the threshold value for $\alpha_k$ is selected when the signal $\delta_k$ is negative. The output signal of such a comparator is the inverted version $\delta_k-\alpha_k-\beta_k$ of the signal $\alpha_k+\beta_k-\delta_k$.

Figure 36:
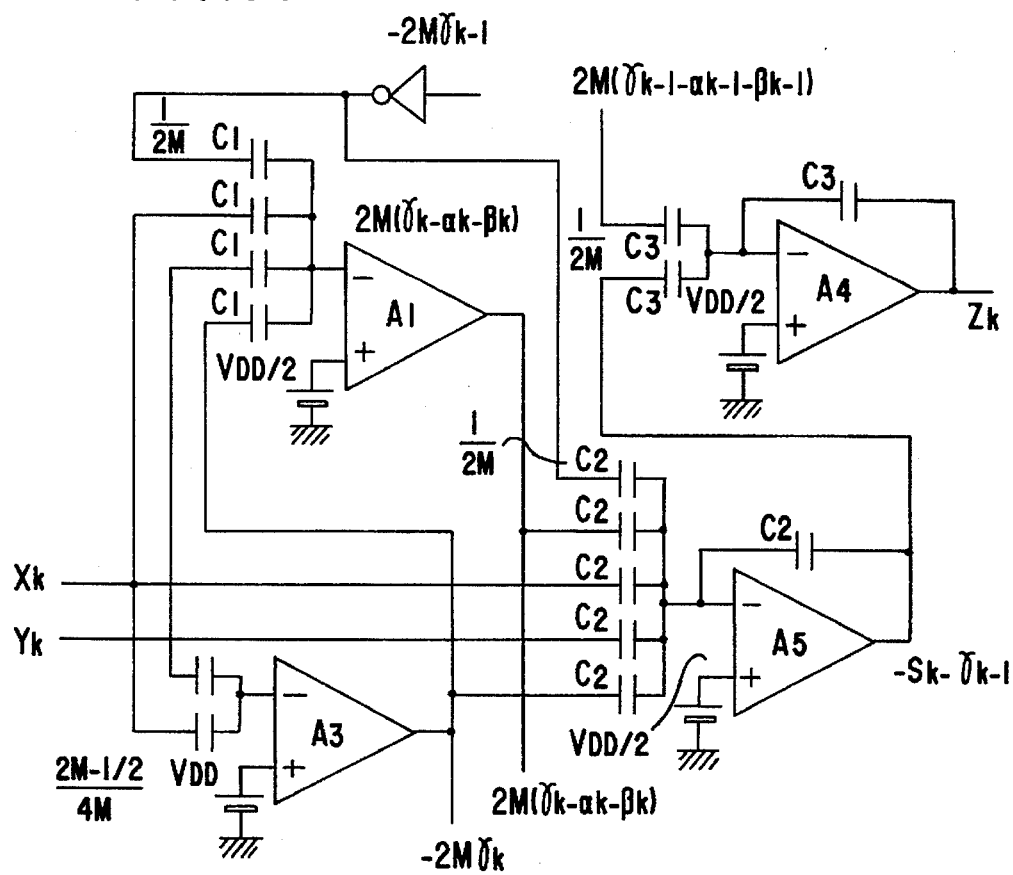
FIG. 36 is a diagram of a second part for explaining the further improvement in the radix-2M (2M+1)-valued redundant adder shown in FIGS. 31 through 34.

FIG. 36 shows an adder based on the above principle. The multiple-input amplifier A$_5$ of the front stage is supplied with the signals $w_k$, $\delta_{k-1}$, $-\delta_k$, $\delta_k-\alpha_k-\beta_k$, and the multiple-input amplifier A$_4$ of the final stage is supplied with the sum signal $-s_k-\delta_{k-1}$ and the carry signal $\delta_{k-1}-\alpha_{k-1}-\beta_{k-1}$.

Figure 37:
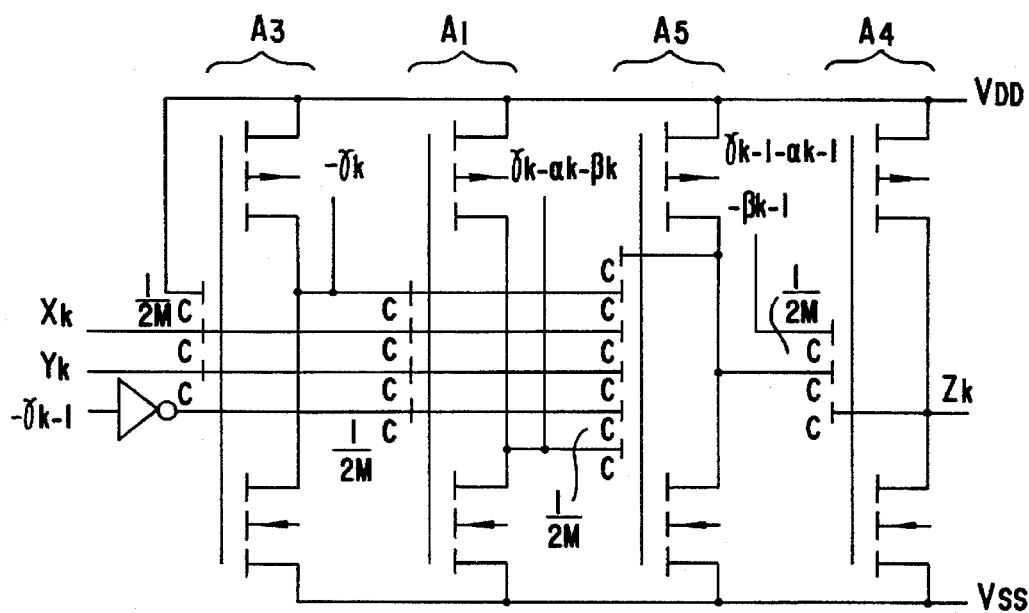
FIG. 37 is a diagram of a third part for explaining the further improvement in the radix-2M (2M+1)-valued redundant adder shown in FIGS. 31 through 34.
Figure 38:
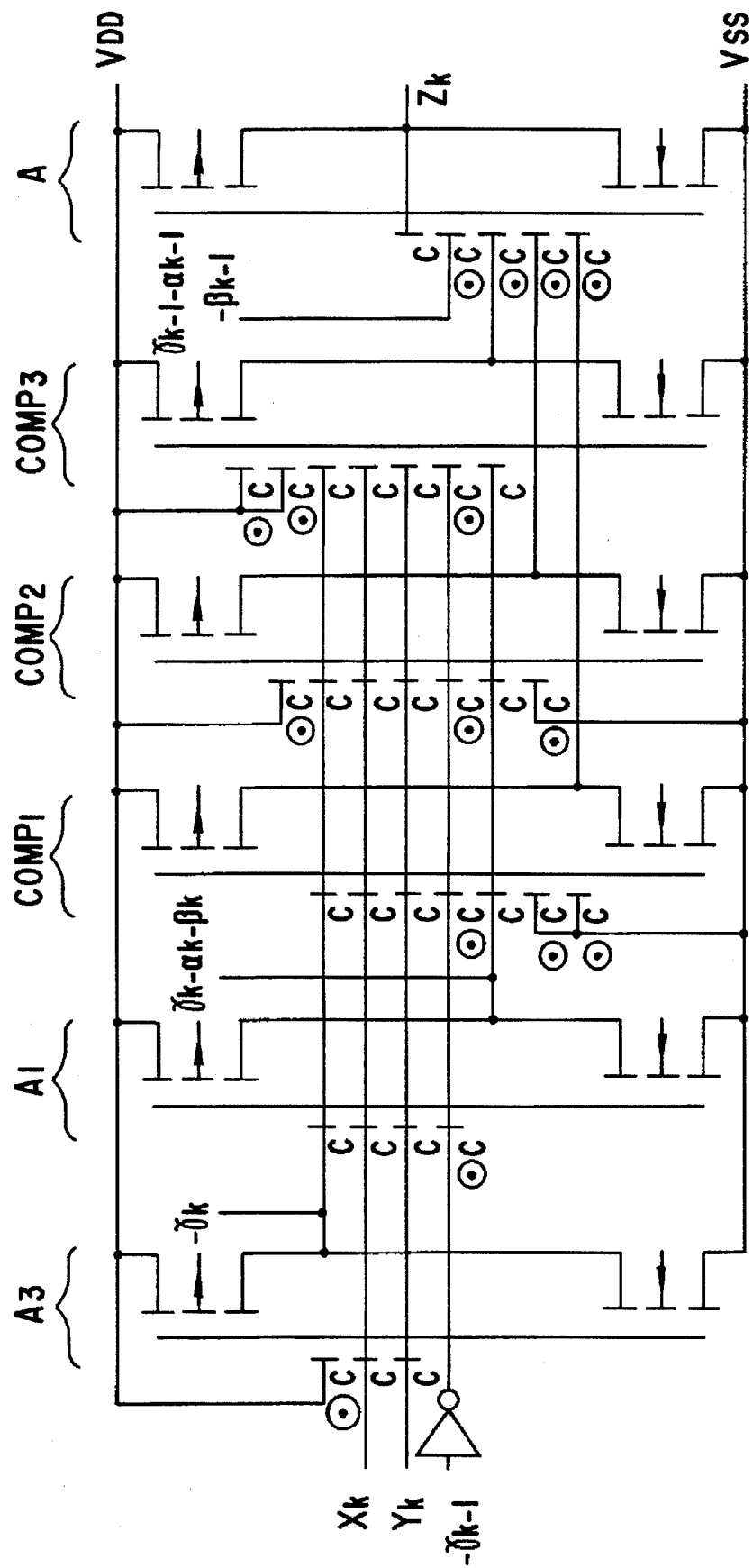
FIG. 38 is a diagram of a fourth part for explaining the further improvement in the radix-2M (2M+1)-valued redundant adder shown in FIGS. 31 through 34.

FIGS. 37 and 38 show the detailed circuit configurations based upon the above, which are simpler than those shown in FIGS. 31 through 34. The multiple-input amplifier A$_4$ of the final stage may be replaced by a neuron-MOS source-follower circuit.

FIGS. 39 through 42 show multiple-valued adders in which the multiple-valued output signal is converted into a binary-coded output signal.

In all the above-mentioned multiple-valued adders shown in FIG. 19 through FIG. 38, the multiple values are represented by corresponding voltage levels of one signal line. It will now be noted that in the multiple-valued adders shown in FIGS. 22, 26, 30, 34 and 38, the output signals of the comparators functioning as quantizers are binary signals, which are returned to the multiple voltage levels at the multiple-input amplifier A of the final stage. Hence, it becomes possible to output binary-coded output signal by directly outputting the output signals of the comparators. The input signals $x_k$ and $y_k$ use an identical pair of binary-code signals when the adders are connected to other adders. In the configurations shown in FIGS. 22, 26, 30, 34 and 38, there are respectively (2M+2) equally weighted signals, (2M+2) equally weighted signals, (2M+1) equally weighted signals, (2M+2) equally weighted signals and 2M equally weighted signals, and these equally weighted signals are coupled to the comparators through capacitances C/(2M+2), C/2M, C/(2M+1), C/2M and C/2M, respectively.

However, in the configurations shown in FIG. 26 and FIG. 34, the product of the number of signals and the capacitance does not become C. Hence, by appropriately converting these signals, it is possible to reduce the number of binary signals.

Figure 39:
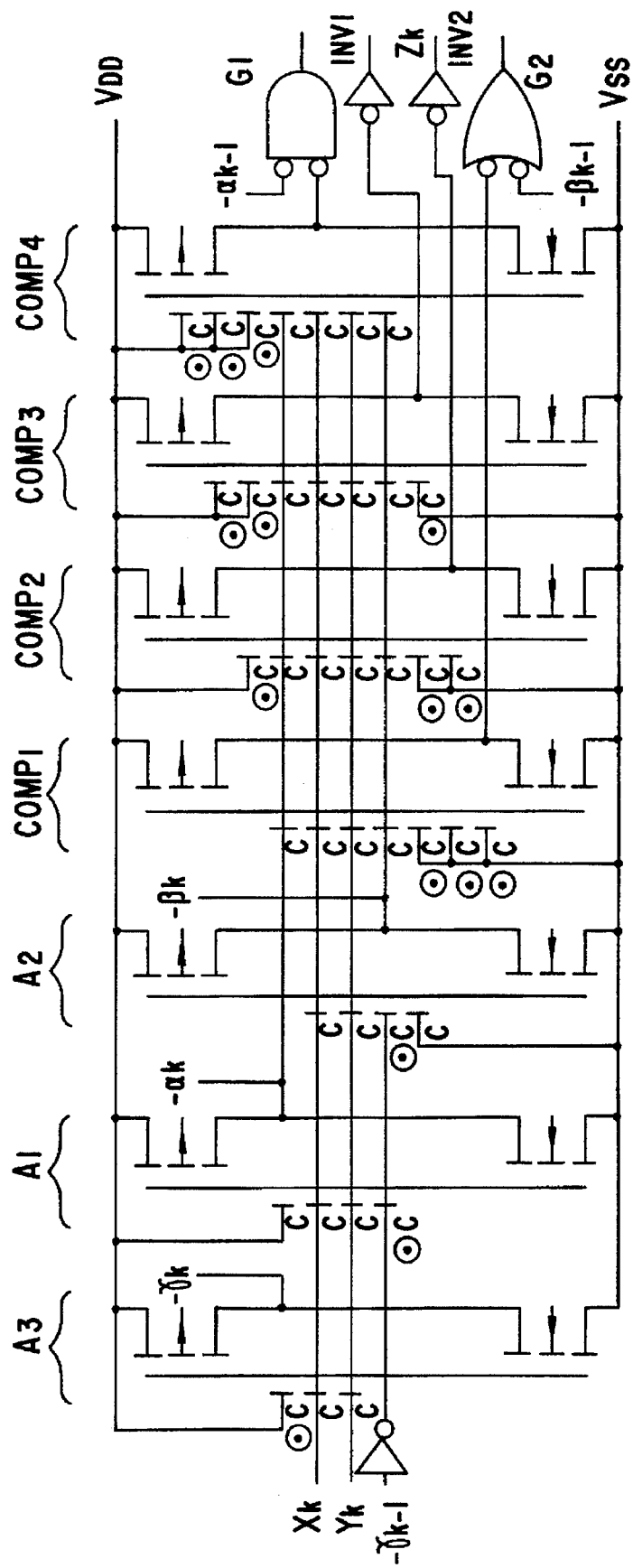
FIG. 39 is a circuit diagram of a multiple-valued adder which outputs a binary encoded signal corresponding to a multiple value.

FIG. 39 shows a modification of the configuration shown in FIG. 26 directed to reducing the number of signal lines. In FIG. 39, a signal line is connected through the capacitance C for a respective one of the input signals $x_k$ and $y_k$ for the sake of simplicity. However, in actuality, 2M signal lines are respectively connected through C/2M. The principle of simplifying the circuit configuration due to a reduction in the number of signals will be described below.

As will be seen from FIG. 23, when the signal $\alpha_{k-1}$ is low (that is, $-\alpha_{k-1}$ is high), the signal $\delta_{k-1}$ is low, and the characteristic of the signal $s_k$ is indicated by the broken line. In this case, the signal $s_k$ does not become the lowest level among the (2M+1) levels, the output signal of the comparator $COMP_4$ capable of detecting the lowest level is low. Hence, the output signal $-\alpha_{k-1}$ and the output signal of the comparator $COMP_4$ are not simultaneously high. Hence, it is possible to unify the above signals by means of an OR gate. Similarly, the output signal $=\beta_{k-1}$ and the output signal of the comparator $COMP_1$ capable of detecting the highest level are not simultaneously low, and can be therefore unified by means of an AND gate. In the configuration shown in FIG. 39, a NAND gate $G_1$ and a NOR gate $G_2$ are used to prevent the inverted output levels. Similarly, inverters $INV_1$ and $INV_2$ are connected to output terminals other than those to which the NAND gates $G_1$ and $G_2$ are connected. However, if it is allowed to use the inverted output levels, OR gates and AND gates can be used, while the inverters $INV_1$ and $INV_2$ can be omitted.

Figure 40:
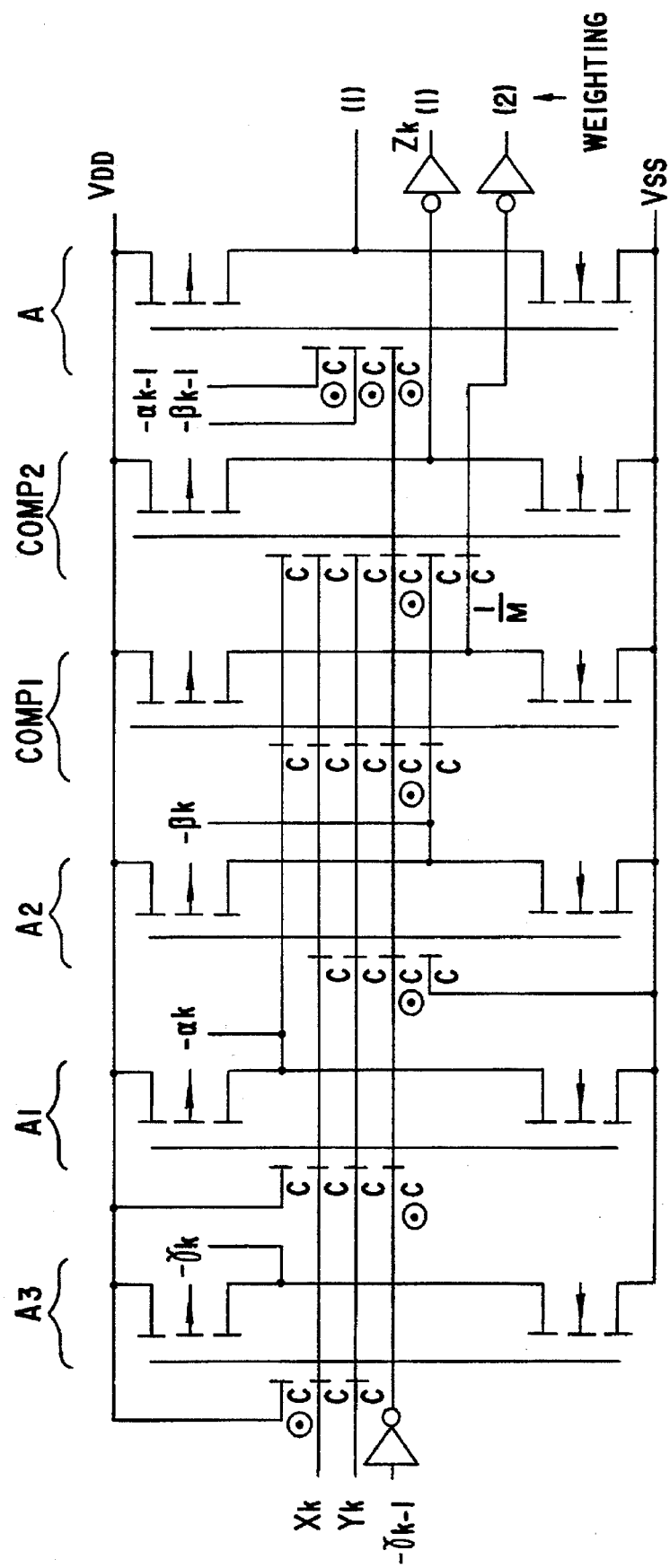
FIG. 40 is a circuit diagram of another multiple-valued adder which outputs a binary encoded signal corresponding to a multiple value.

FIG. 40 shows a modification of the configuration shown in FIG. 34 directed to reducing the number of signal lines. As has been described with reference to FIG. 35, the signal $\delta_k - \alpha_k - \beta_k$ is the binary value and obtained by applying the signals $\delta_k, -\alpha_k$ and $-\beta_k$ to the comparator A. However, some inverters are needed to force the polarity of the signals to be same. The configuration shown in FIG. 40 relates to the case where M=2, and utilizes the fact that $s_k + \delta_{k-1}$ is four-valued. With the above in mind, comparators $COMP_1$ and $COMP_2$ arranged in a multiple-stage formation are used to quantize $s_k + \delta_{k-1}$. The output signal of the front-stage comparator $COMP_1$ is used to vary the threshold values of the comparator $COMP_2$ of the subsequent stages. Thereby, it is possible to obtain the binary signal which is weighted with the power of 2 in the same principle as that of a successive comparison type A/D converter. Hence, the weighting factors of the three output signals are 2, 1 and 1, respectively, as shown in FIG. 40. The three signal lines may be connected to an adder of the subsequent stage via capacitances C/2, C/4 and C/4.

The comparator of the above type is capable of efficiently performing the quantizing operation and it is therefore possible to considerably reduce the number of elements. On the other hand, the number of delay stages is increased. The comparator can most efficiently operate when the quantization level is equal to the power of 2. However, even in other cases, comparators can be configured in the same concept as described above.

Figure 41:
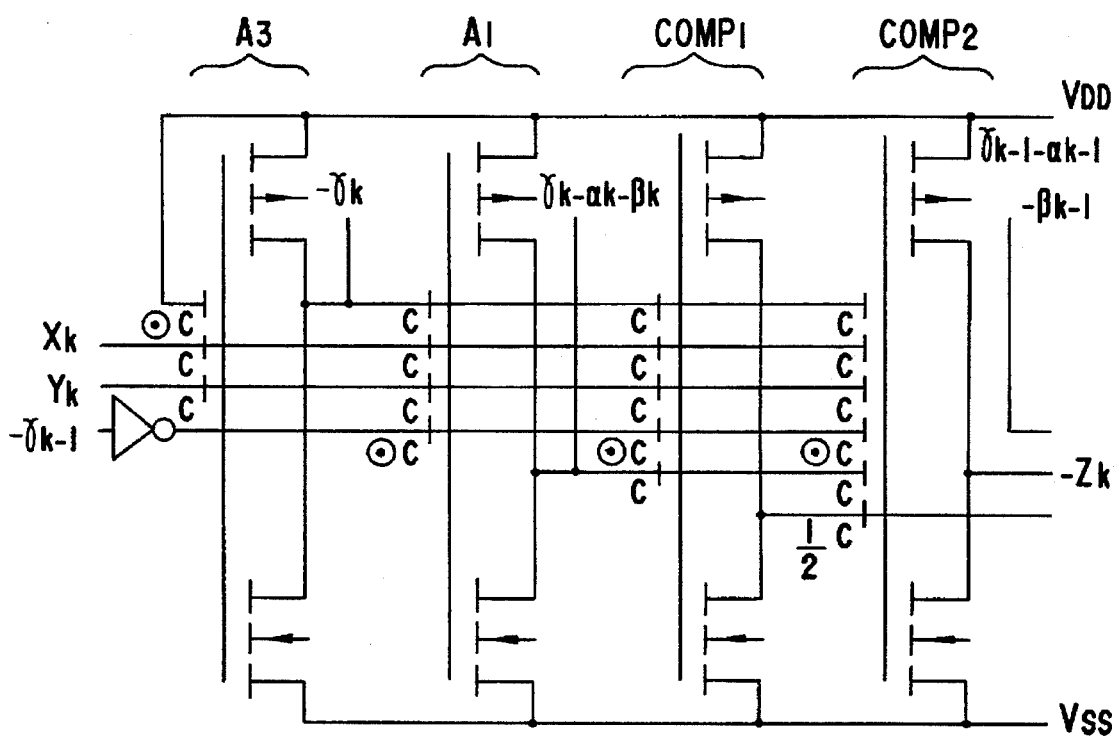
FIG. 41 is a circuit diagram of a still another multiple-valued adder which outputs a binary encoded signal corresponding to a multiple value.

FIG. 41 shows a modification shown in FIG. 38. The configurations shown in FIGS. 35 through 38 do not have excessive signal lines originally. Hence, only the final stage is removed. However, in this case, the comparators in the multiple stages are used to have $\log_2(2M)+1$ signal lines. When M is equal to 2, the weighting factors of the three output signal lines are 2, 1 and 1, as shown in FIG. 40, and may be connected to the next-stage adder through capacitances C/2, C/4 and C/4. The configuration shown in FIG. 41 differs from that shown in FIG. 40 in that no output inverter is needed if it is allowed to have the inverted output level.

Originally, the signal $r_k - \alpha_k - \beta_k$ is obtained, and the redundant adder having a very simple configuration can be obtained. An increased number of delay stages is used while the multiple-input amplifier of the final stage needed in the multiple-valued signal outputting type is not needed. Hence, totally the number of delay stages is equal to the multiple-valued signal outputting type.

The present invention is not limited to the specifically disclosed embodiments, and variations and modifications may be made without departing from the scope of the present invention.

What is claimed is:

1. A multiple-valued logic circuit which receives plural multiple-valued input logic signals corresponding to respective numeral values and outputs a multiple-valued output logic signal corresponding to a sum of the respective numeral values, said multiple-valued logic circuit comprising n operation circuits where n is an integer, the kth operation circuit comprising:

multiple-input comparators generating carry signals; and multiple-input amplifiers performing weighted linear voltage adding operations on input signals at the kth digit, carry signals of the input signals at the kth digit and carry signals from the (k−1)th digit where k is 0, 1, 2, . . . , n−1, the multiple-input amplifier having a feedback circuit having a capacitance, the multiple-input comparator and the multiple-input amplifier being connected to corresponding input signals through capacitances, a voltage gain of the multiple-input amplifier being based on a ratio of the capacitance through which the input signals applied and the capacitance of the feedback circuit.

2. The multiple-valued logic circuit as claimed in claim 1, further comprising plural discriminators for determining at which one of the multiple levels the input logic signals, the output logic signals or intermediate signals available in the multiple-valued logic circuit are, and a multiple-input amplifier for performing a linear voltage adding operation on output signals of the discriminators.

3. A multiple-valued logic circuit which receives plural multiple-valued input logic signals corresponding to respective numeral values and outputs a multiple-valued output logic signals corresponding to a sum of the respective numeral values, said multiple-valued logic circuit comprising n operation circuits where n is an integer, the kth operation circuit comprising:

multiple-input comparators generating a carry signal; and other multiple-input comparators for identifying a logical level of a value obtained by subtracting carry signals of the kth digit from a sum of input signals at the kth digit, the multiple-input comparator receives input signals through capacitances.

4. The multiple-valued logic circuit as claimed in claim 3, further comprising, for the kth digit, a multiple-input adder which receives, through capacitances, the output signals of said other multiple-input comparators and carry signals from the (k−1)th digit.

5. The multiple-valued logic circuit as claimed in claim 3, wherein output signals of said other multiple-input comparators located at the kth digit and carry signals from the (k−1)th digit are binary signals.

6. The multiple-valued logic circuit as claimed in claim 3, further comprising, for the kth digit, binary logic circuits which receive output signals of said other multiple-input comparators located at the kth digit and carry signals from the (k−1)th digit and which output resultant binary signals.

7. The multiple-valued logic circuit as claimed in any of claims 1 to 6, wherein:

each the multiple-valued logic signal is a code in which each digit is weighted with a power of R where R is a natural number equal to or greater than 2 and assumes any of N values, which correspond to voltage levels obtained by equally dividing a certain voltage range which is included in the input/output voltage range of the multiple-input comparator and multiple-input amplifier.

8. The multiple-valued logic circuit as claimed in claim 7, wherein:

said code is one of a radix-2M (2M+3)-valued code where M is a natural number equal to or greater than 2 and a radix-R N-valued code satisfying N≧R+2 where R and N are natural numbers and R is equal to or greater than 3; and said multiple-input comparator generating a carry signal compares the sum of the input signals at the kth digit and a given numeral value.

9. The multiple-valued logic circuit as claimed in claim 7, wherein:

said code is a radix-2M (2M+1)-valued code where M is a natural number;

said multiple-input comparator generating a carry signal located at the kth digit compares the sum of the input signals at the kth digit and a numeral value indicative of the sign of the sum of the input signals at the (k−1)th digit with a given numeral value;

the carry signal are represented by two comparison results output by said multiple-input comparator; and a multiple-input comparator located at the kth digit outputs a numeral value indicative of the sign of the sum of the input signals at the kth digit.

10. The multiple-valued logic circuit as claimed in claim 7, wherein:

said code is a radix-2M (2M+1)-valued code where M is a natural number; and said carry generating circuit comprises a first comparator which detects the sign of the sum of the input signals at the kth digit, and a second comparator which compares, with a given numeral number, the sum of an output signal of the first comparator, the input signals at the kth digit, and a numeral value indicative of the sign of the sum of the input signals at the (k−1)th digit.

11. The multiple-valued logic circuit as claimed in claim 2, wherein said multiple-input amplifier comprises a circuit which comprises a CMOS inverter circuit which receives the input logic signals through respective capacitances and has a feedback circuit connecting an output terminal of said CMOS inverter circuit and one of input terminals of said CMOS inverter circuit.

12. The multiple-valued logic circuit as claimed in claim 2, wherein said multiple-input amplifier comprises a circuit which comprises a CMOS inverter circuit which receives the input logic signals through respective capacitances and has a feedback circuit connecting an output terminal of said CMOS inverter circuit and one of input terminals of said CMOS inverter circuit.

13. The multiple-valued logic circuit as claimed in any of claims 1 to 6, wherein said multiple-input comparator comprises a circuit which receives the input logic signals through respective capacitances.

14. The multiple-valued logic circuit as claimed in claim 7, wherein said multiple-input comparator comprises a circuit which receives the input logic signals through respective capacitances.

* * * * *